US008823957B2

(12) United States Patent
Miyamoto

(10) Patent No.: US 8,823,957 B2
(45) Date of Patent: Sep. 2, 2014

(54) OPERATION DEVICE FOR IMAGE FORMING APPARATUS, AND OPERATION METHOD THEREOF

(75) Inventor: Takanori Miyamoto, Osaka (JP)

(73) Assignee: Kyocera Document Solutions Inc., Osaka-shi (JP)

( * ) Notice: Subject to any disclaimer, the term of this patent is extended or adjusted under 35 U.S.C. 154(b) by 384 days.

(21) Appl. No.: 13/234,526

(22) Filed: Sep. 16, 2011

(65) Prior Publication Data

US 2012/0075652 A1 Mar. 29, 2012

(30) Foreign Application Priority Data

Sep. 29, 2010 (JP) ................................ 2010-219596

(51) Int. Cl.
 *G06F 3/12* (2006.01)
 *G06F 15/00* (2006.01)
 *G06K 1/00* (2006.01)
 *G03G 15/00* (2006.01)

(52) U.S. Cl.
 USPC ............. 358/1.13; 358/1.9; 358/1.15; 399/81

(58) Field of Classification Search
 None
 See application file for complete search history.

(56) References Cited

U.S. PATENT DOCUMENTS

| | | | | |
|---|---|---|---|---|
| 5,390,005 | A * | 2/1995 | Kimoto et al. | ............. 399/81 |
| 7,747,964 | B2 * | 6/2010 | Morikawa | ............. 715/781 |
| 8,446,600 | B2 * | 5/2013 | Misumi et al. | ............. 358/1.13 |
| 2001/0004424 | A1 | 6/2001 | Mutoh et al. | |
| 2005/0084277 | A1 | 4/2005 | Kushida et al. | |
| 2006/0285869 | A1 | 12/2006 | Kushida et al. | |
| 2008/0215978 | A1 * | 9/2008 | Bamba | ............. 715/713 |
| 2009/0296131 | A1 | 12/2009 | Yoshida et al. | |
| 2010/0149575 | A1 * | 6/2010 | Ozawa et al. | ............. 358/1.13 |
| 2013/0167077 | A1 * | 6/2013 | Nishihashi | ............. 715/800 |
| 2014/0078535 | A1 * | 3/2014 | Okada et al. | ............. 358/1.13 |

FOREIGN PATENT DOCUMENTS

| | | |
|---|---|---|
| JP | 2004-029350 A | 1/2004 |
| JP | 2005-18607 | 1/2005 |
| JP | 2006-114964 | 4/2006 |
| JP | 2008227771 A | 9/2008 |
| JP | 2010-159922 | 7/2010 |

OTHER PUBLICATIONS

English Translation of JP 2008-227771 A.
Communication from a foreign patent office for a counterpart foreign application dated Jun. 19, 2013.

(Continued)

*Primary Examiner* — Ming Hon
(74) *Attorney, Agent, or Firm* — Knobbe Martens Olson & Bear LLP

(57) ABSTRACT

The operation device according to the present invention includes a touch panel configured to enable selection of a predetermined key contained in a predetermined screen, a function screen display reception unit for displaying a screen including a screen area and a retreat area being an area that is different from the screen area, an operation unit, a screen switching reception unit for displaying an icon key corresponding to the function of the second function screen on the touch panel in a selectable configuration at a predetermined position of the retreat area, a reduced screen display reception unit that displays a first reduced screen key for reducing the first function screen on the touch panel in a selectable configuration in the retreat area, and a function screen switching unit for switching the display of the first function screen in the screen area to the display of the second function screen.

12 Claims, 17 Drawing Sheets

(56) References Cited

OTHER PUBLICATIONS

English Machine Translation of JP 2005-18607.
English Machine Translation of JP 2006-11496.
English Machine Translation of JP 2010-159922.
Communication from a foreign patent office for a counterpart foreign application dated Jan. 9, 2013.

* cited by examiner

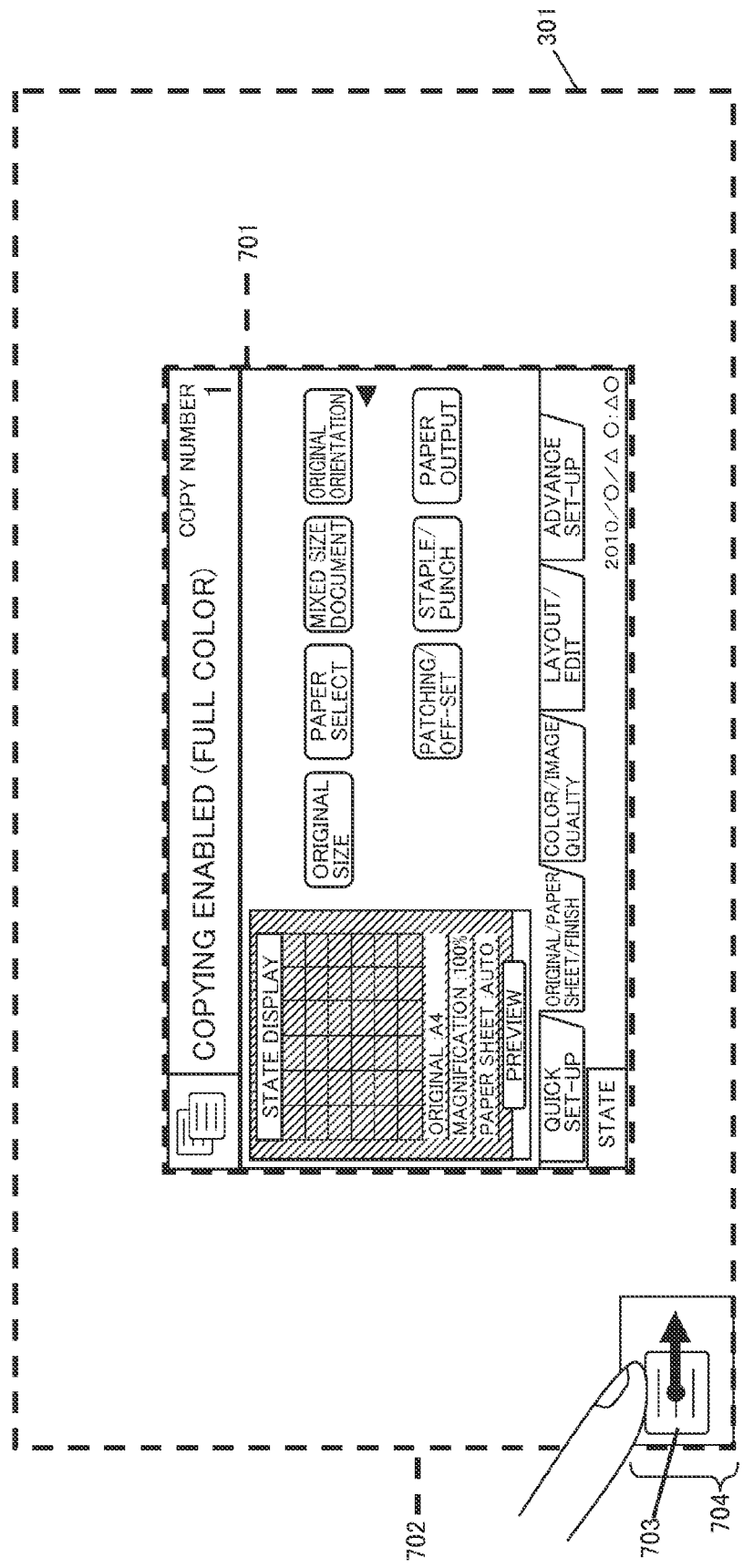

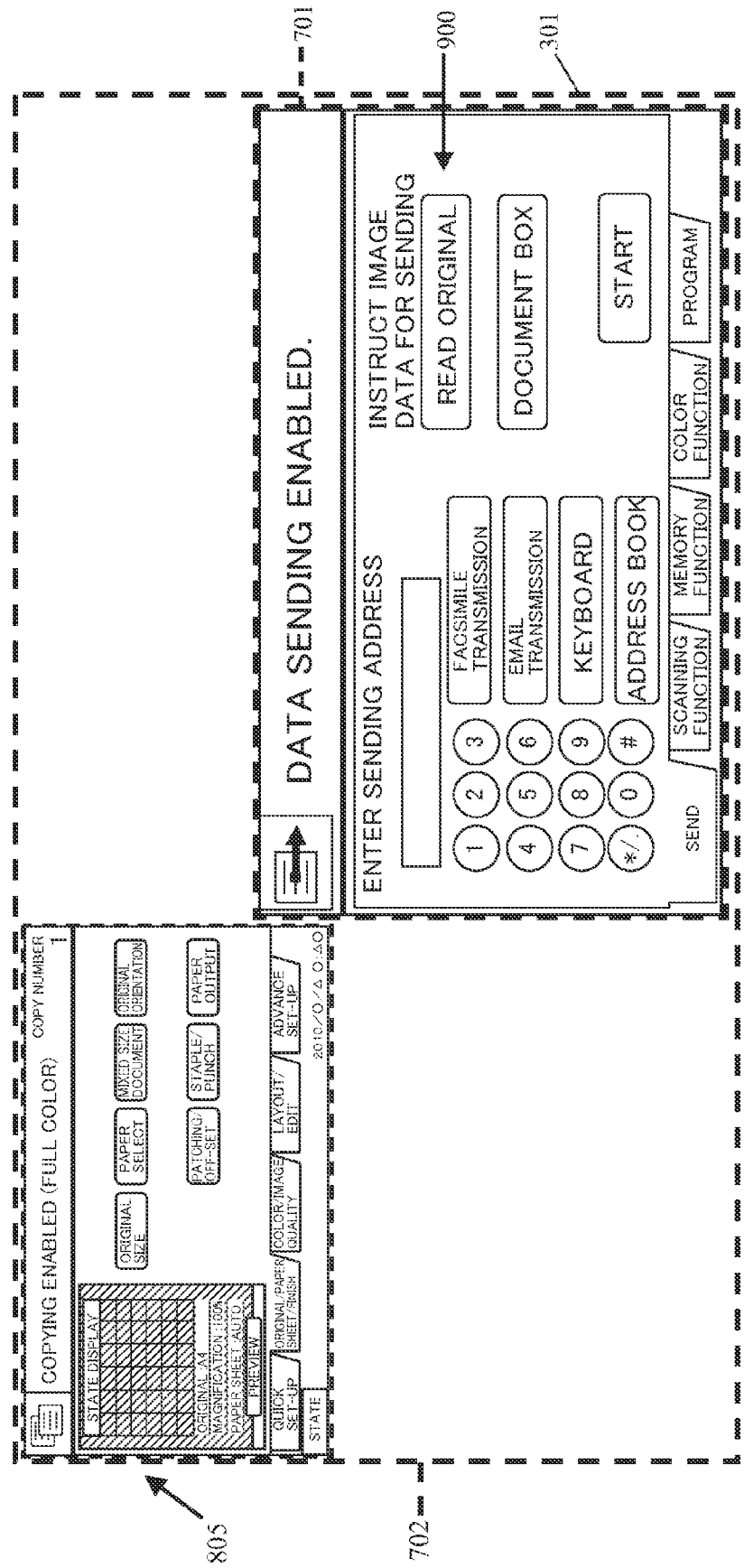

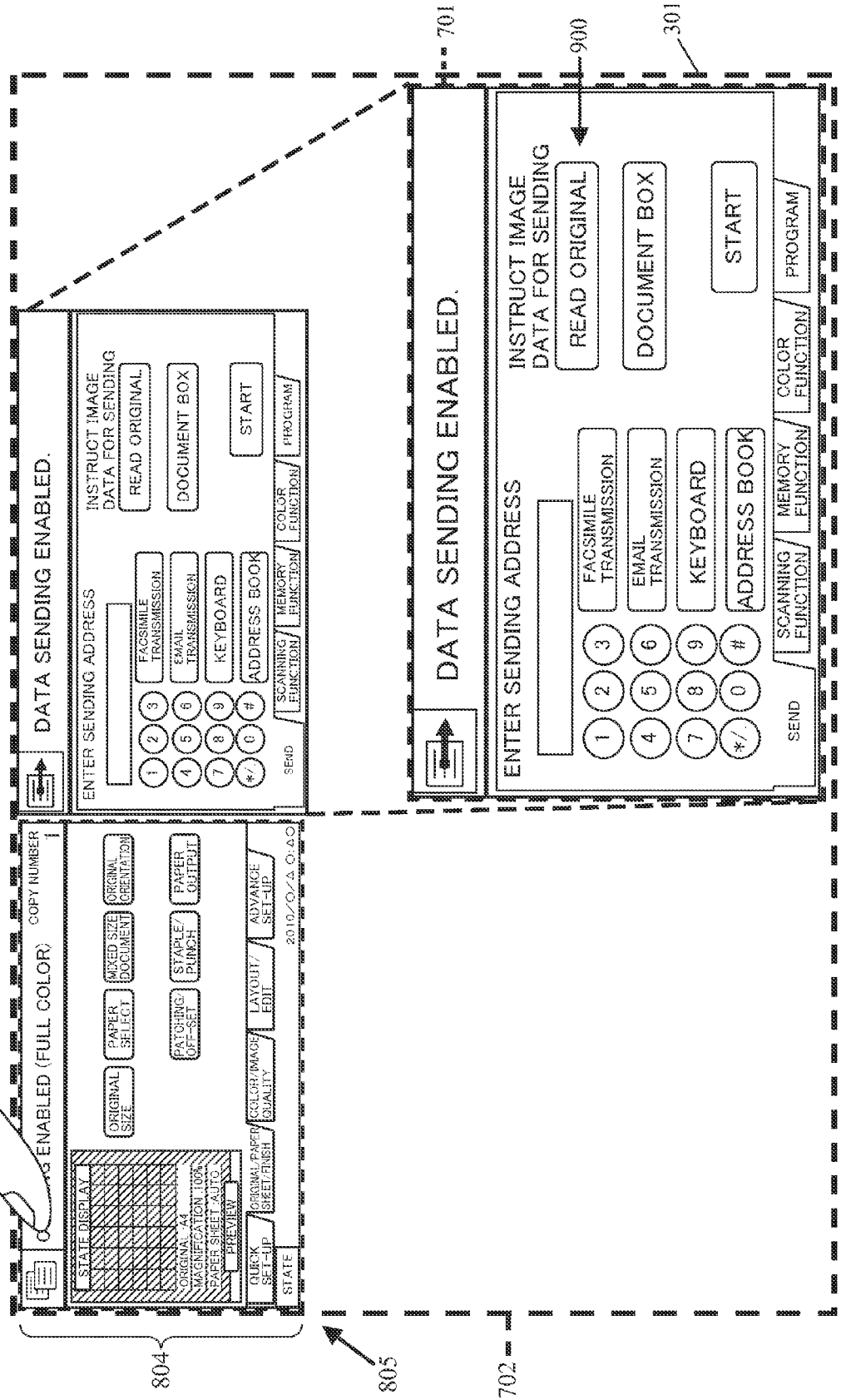

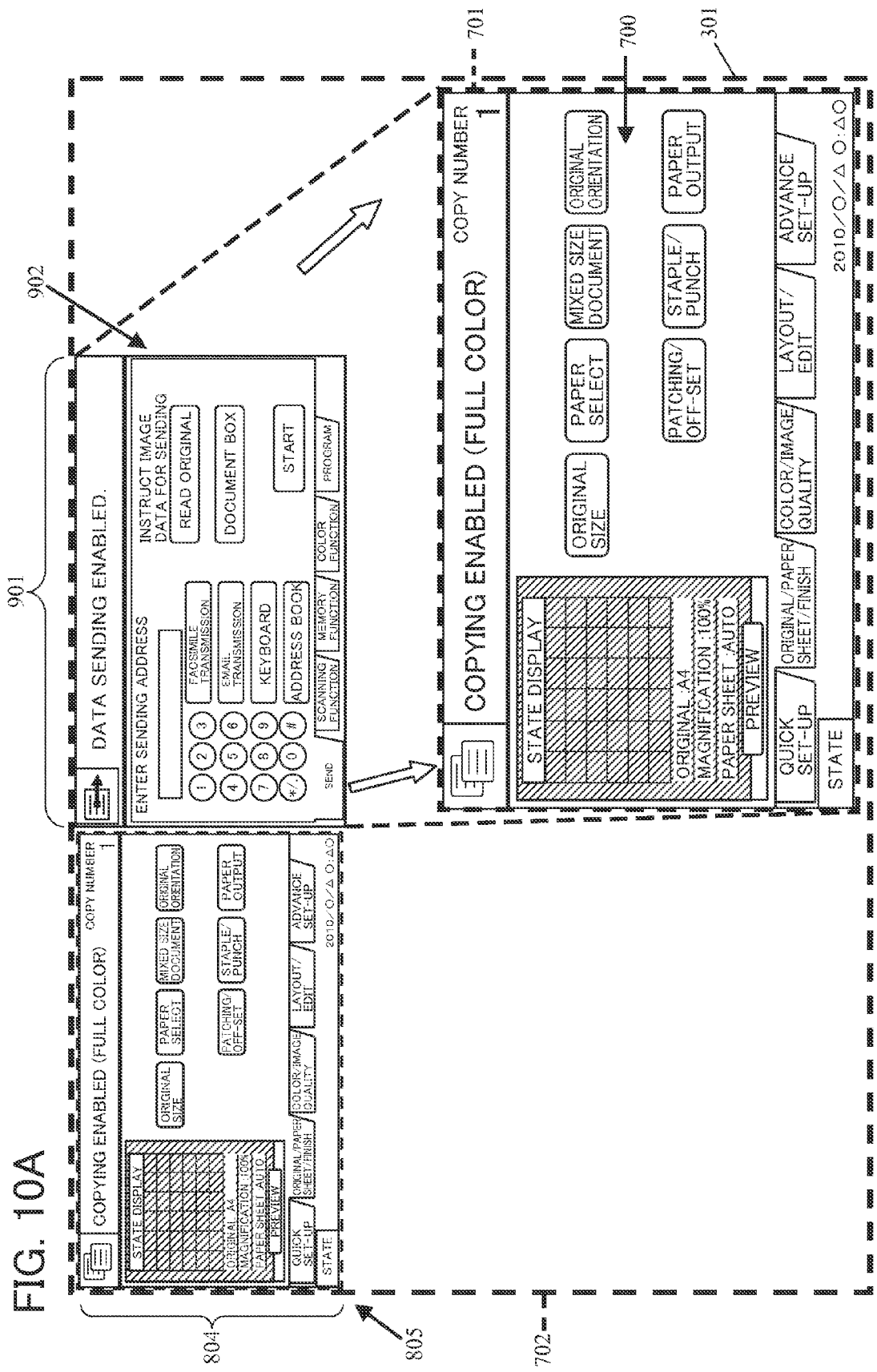

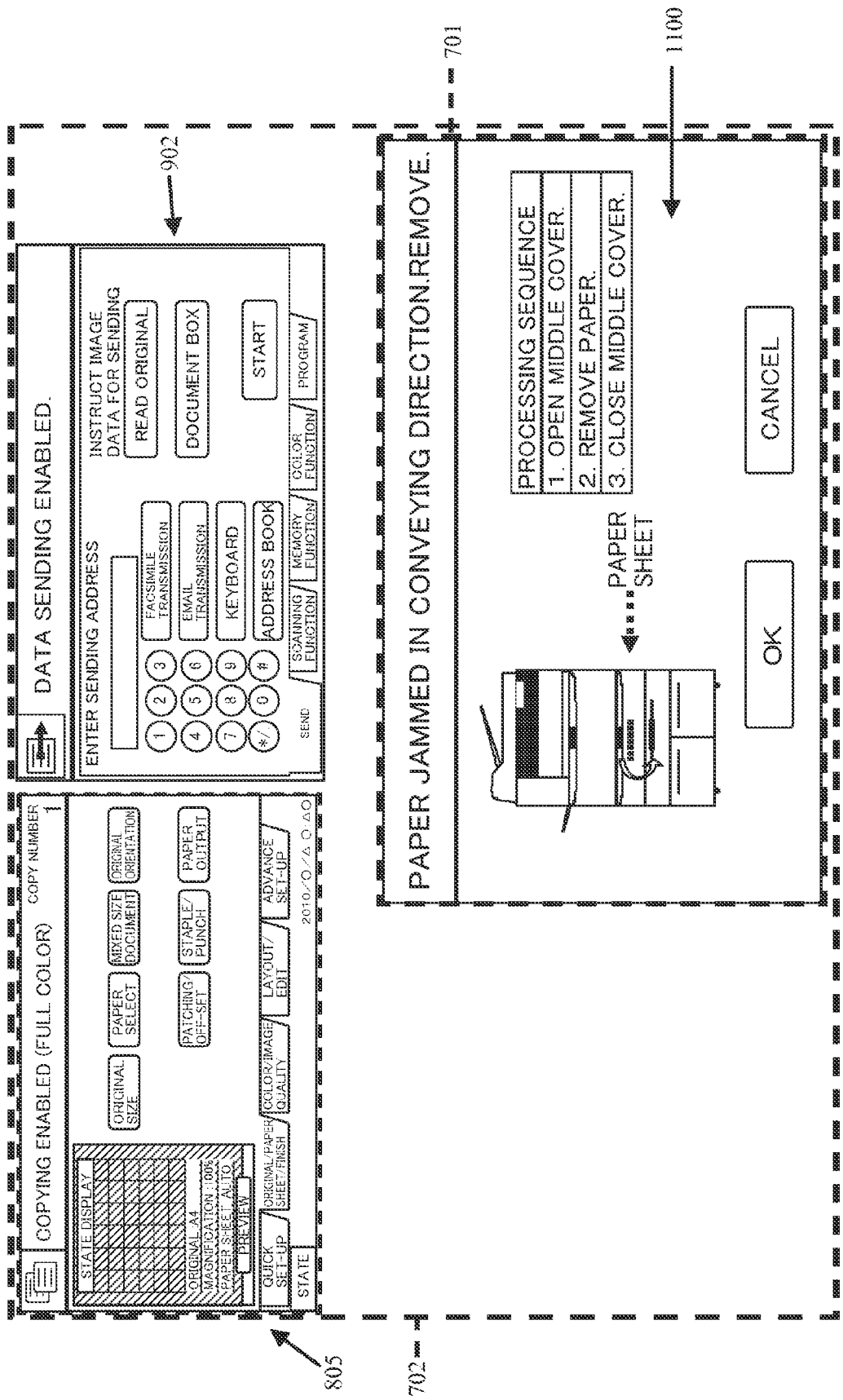

ns. Furthermore an image forming apparatus that adopts this type of conventional display method does not enable switching of the display of a screen related to a function during execution of a predetermined function to the display of a screen related to another function. Consequently, a user must wait until completion of the execution of the function.

OPERATION DEVICE FOR IMAGE FORMING APPARATUS, AND OPERATION METHOD THEREOF

This application is based on and claims the benefit of priority from Japanese Patent Application No. 2010-219596, filed on 29 Sep. 2010, the content of which is incorporated herein by reference.

BACKGROUND OF THE INVENTION

1. Field of the Invention

The present invention relates to an operation device. Furthermore, the present invention relates to an image forming apparatus that includes the operation device. In addition, the present invention relates to an operation method for the operation device.

2. Related Art

Recent years has witnessed broad product diversification of image forming apparatuses such as multifunction peripherals, copying machines, or the like that include multiple functions. This type of image forming apparatus includes a copying function for forming an image of an original, that is read by an original reading unit, with an image forming unit on a sheet of paper, a printer function for forming an image prepared by an external apparatus with the image forming unit on a sheet of paper, a facsimile function for sending the image of the original read by the original reading unit with a communication unit to an external apparatus, and the like.

A part or the whole of the items to be set such as operational conditions or the like in this type of multifunction image forming apparatus may differ with respect to each function. When operation members such as separate key switches are provided for all setting items in a multifunction image forming apparatus, simple execution of input operations by a user in relation to the setting items related to functions for execution may not be possible as a result of the complexity of the operation unit configuration. Consequently, a conventional multifunction image forming apparatus is used in which respective function items are constantly displayed on a predetermined display area on a screen in which setting items are displayed on a display unit, and when one function item is pressed, a predetermined number of the selection items associated with the function item is displayed in the screen.

In addition to independent execution of each function, a multifunction image forming apparatus exists in which a plurality of functions is executed in parallel. For example, this type of image forming apparatus enables execution of a reservation function for reserving a subsequent copying function during executing of the copying function, an interrupt copying function for interrupting the copying under other copying conditions during execution of the copying function, or the like. Furthermore, this type of image forming apparatus enables execution of a print reservation function for storing received image data sent from an external apparatus even during execution of the printing function. This type of image forming apparatus enables execution of a memory send/receive function for sending or receiving image data between an image memory and an external apparatus even during execution of the facsimile function.

When a conventional display method is used as the display method for a function item on the display unit in this type of image forming apparatus, display of the screen for a function under execution cannot be performed together with display of a screen related to another function. As a result, the user cannot gain an accurate understanding of the content (content of the setting conditions) of a screen related to a plurality of functions. Furthermore an image forming apparatus that adopts this type of conventional display method does not enable switching of the display of a screen related to a function during execution of a predetermined function to the display of a screen related to another function. Consequently, a user must wait until completion of the execution of the function.

For example, a function display method is disclosed that uses a display screen to display information that relates respectively to a plurality of types of functions that can be selected as a function for execution by the apparatus. (Related Art 1) This function display method is configured so that the display area allocated separately to each function in the display screen is varied in response to whether or not the function is selected, and when selection is possible of a part of the functions that are not selected as a result of the functions that are currently selected, a message to that effect is displayed in the display screen.

This configuration may enable a user to simply comprehend the selection state of each function from the position, shape or surface area of the display area for each function on the display screen when selecting a function for execution on the apparatus, and may enable the user to simply comprehend whether or not a part of the functions of those respective functions can be selected from the display content on the display screen.

Furthermore, an apparatus for display of arbitrary information content is disclosed that is configured from a display unit that has a display screen of a predetermined size and displays information content, and a control apparatus for control of input and output by the display unit (Related Art 2). The control apparatus executes divided display control in relation to a divided display area having two or more divisions in which the display screen is divided and delimited in advance into a vertical or horizontal direction for display of the information content of a superior layer in at least one of the divided display areas, and for the display of the information content of an inferior layer in the other of the divided display areas.

This configuration enables a user to observe the display content of a superior level and the display content of an inferior level at the same time on the same display screen. In addition, in contrast to switching the whole display from the superior layer information content to the inferior layer display content, this configuration enables the information content from the superior layer to remain on the same display screen, and therefore a user may improve the function selection operation characteristics when the display screen is applied as a function selection operation screen or the like.

In addition, a sheet processing system is disclosed that includes a plurality of sheet processing apparatuses that has a sheet processing function, and that executes a job being a sheet processing operation unit with one sheet processing apparatus, or with a combination of sheet processing apparatuses. (Related Art 3) This sheet processing system enables parallel execution of a plurality of jobs, and is provided with a display unit for enabling simultaneous division and display in a single display frame of a job display screen for each job in response to the number of jobs executed during parallel execution of a plurality of jobs.

This configuration enables superior visualization and simultaneous display of a plurality of job displays by use of a screen division when executing a plurality of jobs in parallel.

When using Related Art 1, a user can recognize the selection state of each function. However, the screen for each function is displayed as a screen that differs from the screen that is visually observed by the user. Consequently, it is not clear whether the visibility for a user is satisfactory, and a user may encounter difficulties in relation to directly comprehending the correlation between the function and the screen.

When using Related Art 2, since the display content of a superior layer in relation to a predetermined function is displayed on the same display screen as the display content of an inferior layer, it may become unclear whether the display method is applicable to a plurality of functions.

When using Related Art 3, since the image displayed on the display unit is dynamically varied in response to the state of the plurality of jobs, the content of the screen must be comprehended by a user at each change of a screen.

SUMMARY OF THE INVENTION

The present invention has the object of providing an operation device that improves the visibility and the operation characteristics for a user before and after switching a screen display.

The present invention has the further object of providing an image forming apparatus including an operation device enabling the improvement of the visibility and the operation characteristics for a user before and after switching a screen display.

The present invention has yet the further object of providing an operation method for improving the visibility and the operation characteristics for a user before and after switching a screen display.

The present invention relates to an operation device including a touch panel that has a touch sensor that is disposed on the top surface side for detecting contact of a contact object, and a display unit for enabling display of a predetermined screen, the touch panel configured to enable selection of a predetermined key contained in a predetermined screen, a function screen display reception unit for displaying a screen including a screen area for display of a first function screen related to first function and a second function screen related to a second function, and a retreat area being an area that is different from the screen area, an operation unit for receiving an operation from an external unit, a screen switching reception unit for displaying an icon key corresponding to the function of the second function screen on the touch panel in a selectable configuration at a predetermined position of the retreat area when the first function screen is displayed in the screen area and an instruction is received through the operation unit to switch from the display of the first function screen to the display of the second function screen, a reduced screen display reception unit that displays a first reduced screen key for reducing the first function screen on the touch panel in a selectable configuration in the retreat area when the icon key on the touch panel is selected, and a function screen switching unit for switching the display of the first function screen in the screen area to the display of the second function screen when the first reduced screen key is displayed in the retreat area.

Furthermore, the present invention is an image forming apparatus that includes an operation device.

The operation device has a touch panel that has a touch sensor that is disposed on the top surface side for detecting contact of a contact object, and a display unit for enabling display of a predetermined screen, the touch panel configured to enable selection of a predetermined key contained in a predetermined screen, a function screen display reception unit for displaying a screen including a screen area for display of a first function screen related to first function and a second function screen related to a second function, and a retreat area being an area that is different from the screen area, an operation unit for receiving an operation from an external unit, a screen switching reception unit for displaying an icon key corresponding to the function of the second function screen on the touch panel in a selectable configuration at a predetermined position in the retreat area when the first function screen is displayed in the screen area and an instruction is received through the operation unit to switch from the display of the first function screen to the display of the second function screen, the reduced screen display reception unit for displaying a first reduced screen key that reduces the first function screen on the touch panel in a selectable configuration in the retreat area when the icon key on the touch panel is selected, and a function screen switching unit for switching the display of the first function screen in the screen area to the display of the second function screen when the first reduced screen key is displayed in the retreat area.

The present invention relates to an operation method for an operation device including a touch panel that has a touch sensor that is disposed on the top surface side for detecting contact of a contact object, and a display unit for enabling display of a predetermined screen, the touch panel configured to enable selection of a predetermined key contained in a predetermined screen, and an operation unit for receiving an operation from an external unit, the method including a screen switching reception step in which the operation device displays a screen including a screen area for display of a first function screen related to a first function or a second function screen for display of a second function screen related to another function on the touch panel, and a retreat area that is a different area from the screen area, a screen switching reception step in which the operation device displays an icon key corresponding to the function of the second function screen on the touch panel in a selectable configuration at a predetermined position of the retreat area when the first function screen is displayed in the screen area and an instruction is received through the operation unit to switch from the display of the first function screen to the display of the second function screen, a reduced screen display reception step in which the operation device displays a first reduced screen key that reduces the first function screen on the touch panel in a selectable configuration in the retreat area when the icon key on the touch panel is selected, and a function screen switching step in which the operation device switches the display of the first function screen in the screen area to the display of the second function screen when the first reduced screen key is displayed in the retreat area.

Furthermore, the present invention relates to an operation device that includes a touch panel that has a touch sensor that is disposed on the top surface side for detecting contact of a contact object, and a display unit for enabling display of a predetermined screen, the touch panel configured to enable selection of a predetermined key contained in a predetermined screen, a function screen display reception unit for displaying a screen including a screen area for display of a first function screen related to first function and a second function screen related to a second function, and a retreat area being an area that is different from the screen area, a trigger output unit for outputting a predetermined trigger, a screen switching reception unit for displaying an icon key corresponding to the function of the second function screen on the touch panel in a selectable configuration at a predetermined selectable position of the retreat area when the first function screen is displayed in the screen area and a trigger is received from the trigger output unit, a reduced screen display reception unit for displaying a first reduced screen key that reduces the first function screen on the touch panel in a selectable configuration in the retreat area when the icon key on the touch panel is selected, and a function screen switching unit for switching the display of the first function screen in the screen area to the display of the second function screen when the first reduced screen key is displayed in the retreat area.

BRIEF DESCRIPTION OF THE DRAWINGS

FIG. 7B illustrates an example of an icon key displayed on the touch panel according to an embodiment of the present invention.

FIG. 9A illustrates an example of a second overall screen displayed on the touch panel according to an embodiment of the present invention.

FIG. 9B illustrates an example of a second reduced screen displayed on the touch panel according to an embodiment of the present invention.

FIG. 10A illustrates an example of a third overall screen displayed on the touch panel according to an embodiment of the present invention.

FIG. 11B illustrates an example of an icon key displayed on the touch panel according to an embodiment of the present invention.

DETAILED DESCRIPTION OF THE INVENTION

The embodiment of the image forming apparatus including an operation device will be described below with reference to the attached figures to assist in the understanding of the present invention. It should be noted that the present embodiment is a mere example of implementation of the present invention, and in no way restricts the technical scope of the present invention. The alphabetic script "S" attached before a numeral in the flowcharts means "step".

Image Forming Apparatus and Operation Unit

An image forming apparatus (for example, a multifunction peripheral) including an operation device (for example, an operation unit) according to the present embodiment will be described below.

Figure 1:
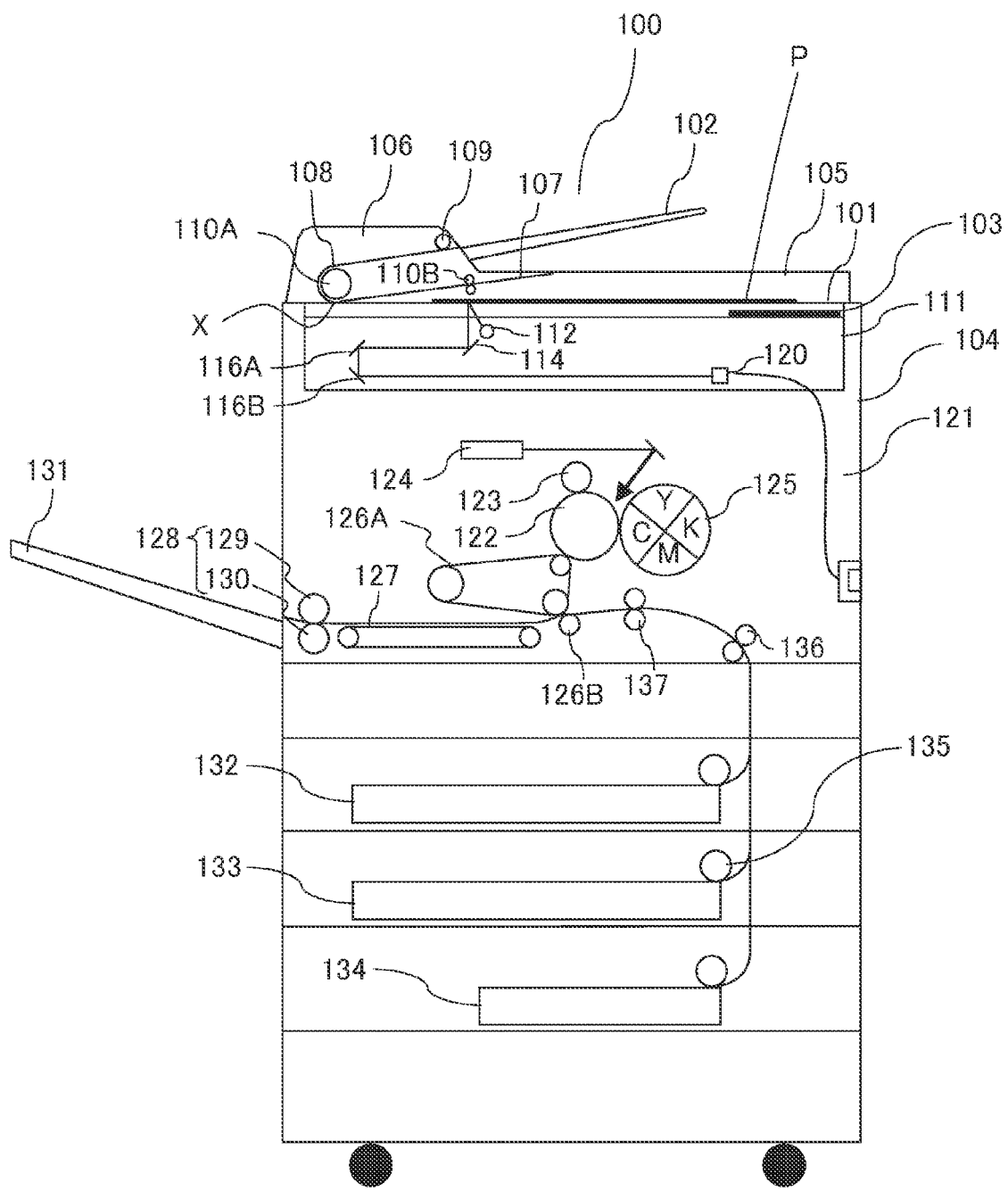
FIG. 1 is a schematic view illustrating an internal entire configuration of a multifunction peripheral according to the present invention.

FIG. 1 is a schematic view illustrating an entire internal configuration of the multifunction peripheral according to the present embodiment. In FIG. 1, details of each component not directly related to the present embodiment are omitted.

The multifunction peripheral 100 according to the present embodiment is a multifunction peripheral or the like that includes for example, a printer or a scanner unit, or a printer, a copying machine, a scanner, a FAX, or the like. The operation of the multifunction peripheral 100 when providing a copying function for an original will be described in a simple manner using the example of a multifunction peripheral.

When printing an original P using the multifunction peripheral 100, for example, a user places the original P on a platen 101 or a document tray 102 shown in FIG. 1, and inputs conditions for copying and makes an instruction for printing through an operation unit 103 (operation device) provided near the platen 101. The configuration of the operation unit 103 will be described below. When the printing instruction is given, printing is executed by operation of the respective units (drive units) described below.

In other words, as shown in FIG. 1, the multifunction peripheral 100 of the present embodiment is provided with a platen cover 105 disposed above the main body 104. The platen 101 is disposed on an upper surface of the main body 104. The platen 101 is configured to be opened and closed with the platen cover 105. The platen cover 105 is provided with an automatic document feeder 106, the document tray 102, and a paper ejection tray 107.

The automatic document feeder 106 is configured by including an original conveyance path 108 formed within the platen cover 105, a pickup roller 109 and conveyance rollers 110a and 110b provided within the platen cover 105, and the like. The original conveyance path 108 is a carrier path for an original that communicates from the document tray 102 to the paper ejection tray 107 via a reading position X at which the original is read by an image reading unit 111 provided in the main body 104.

From a plurality of originals placed on the document tray 102, the automatic document feeder 106 feeds the originals one by one into the original conveyance path 108 by means of the pickup roller 109, lets the originals thus fed pass through the reading position X by means of conveyance rollers or the like, and ejects the original to the paper ejection tray 107 by means of the conveyance roller 110B. While passing through the reading position X, the original is read by the image reading unit 111.

Figure 2:
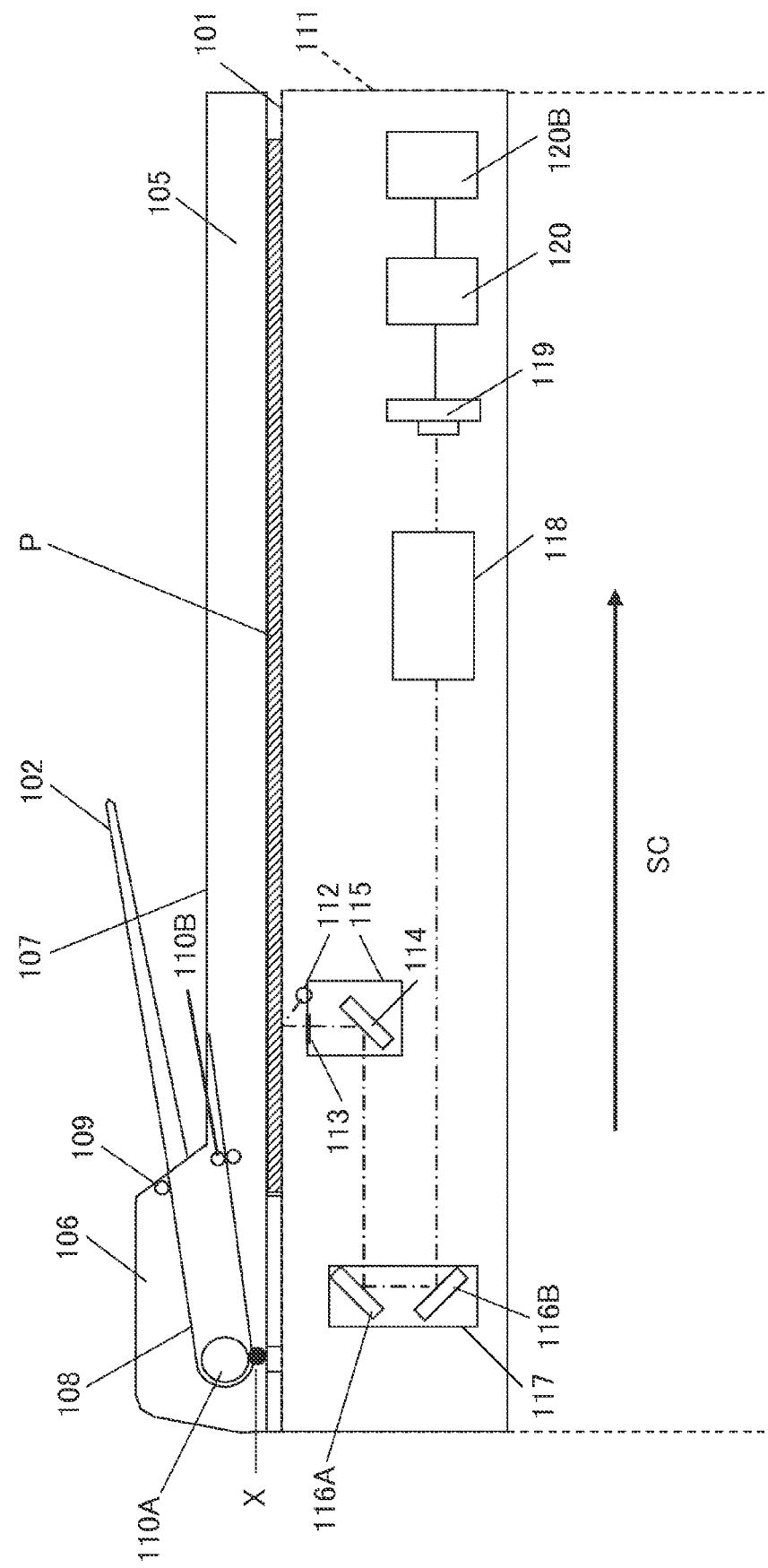
FIG. 2 is an enlarged view of an image reading unit according to the present invention.

The image reading unit 111 is provided below the platen 101, and the details thereof are shown in FIG. 2. The image reading unit 111 is provided with: a first movable carriage 115 including a light source 112 elongated in a scanning direction that irradiates the platen 101, a slit 113 that selectively transmits light from the platen, and a mirror 114 that guides the light from the platen; a second movable carriage 117 including mirrors 116A and 116B that re-reflect reflected light from the first movable carriage 115; a lens group 118 that optically corrects the light guided by the mirrors; an imaging device 119 that receives the light corrected by the lens group 118;

and an image data generating unit 120 that converts the light received by the imaging device 119 into electrical signals and, as necessary, performs correction processing, image quality processing, compression processing, and the like.

In a case of reading the original on the automatic document feeder 106, the light source 112 moves to a position at which the reading position X can be irradiated, and emits light. The light from the light source 112 is transmitted through the platen 101 and reflected by the original that is conveyed through the reading position X and is guided toward the imaging device 119 by means of the slit 113, the mirrors 114, 116A, and 116B, and the lens group 118. The imaging device 119 converts the received light into electrical signals, and transmits the electrical signals to the image data generating unit 120. The light received by the imaging device 119 is inputted to the image data generating unit 120 as analog electrical signals of R (red), G (green), and B (blue). The image data generating unit 120 performs analog-digital conversion, i.e. digitalization. Furthermore, the image data generating unit 120 takes the sequentially converted digital signal as a piece of unit data, and performs correction processing, image quality processing, compression processing and the like on the piece of unit data, thereby generating image data configured by a plurality of pieces of unit data.

Moreover, the image reading unit 111 can also read an original placed on the platen 101, in addition to the original conveyed by the automatic document feeder 106. In a case of reading the original placed on the platen 101, the first movable carriage 115 moves in a sub-scanning direction SC while causing the light source 112 to emit light, and the second movable carriage 117 moves in a direction toward the imaging device 119 at half of the speed of the first movable carriage 115 so as to keep a length of a light path constant between the light source 112 and the imaging device 119.

Similarly to the case of the original being fed by the automatic document feeder 106, the imaging device 119 converts light from the original placed on the platen 101 into electrical signals based on the light guided by the mirrors 114, 116A, and 116B, and the image data generating unit 120 generates image data (document data) based on the converted signals and stores to the storage unit 120B.

The image forming unit 121 is provided below the image reading unit 111 of the main body 104 of the multifunction peripheral, and prints (outputs) an image based on the image data stored in the storage unit 120B. Image data used for printing an image by the image forming unit 121 is image data generated by the image data generating unit 120 as described above, as well as image data received from a terminal such as a personal computer connected to the multifunction peripheral 100 in a network such as a LAN, via a network interface.

The printing method employed by the image forming unit 121 is the xerographic method. The xerographic method is a method of: forming a latent image on the photoreceptor drum 122 by charging the photoreceptor drum 122 evenly by a charging device 123 and then irradiating the photoreceptor drum 122 by a laser irradiator 124; forming a visible image by attaching a toner by a developing device 125; and transferring the visible image to a transfer medium using a transfer roller.

In a case of a multifunction peripheral supporting full color image, the abovementioned developing device (rotary developer) 125 rotates in a circumferential direction about a rotational axis that is perpendicular to the paper surface in FIG. 1, and a developing unit containing a toner of a corresponding color is positioned at a position opposing the photoreceptor drum 122. In this state, the latent image on the photoreceptor drum 122 is developed by the toner stored in the developing unit 125, and is transferred to an intermediate transfer belt 126A. It should be noted that the developing device 125 includes four developing units (Y), (C), (M) and (K) respectively storing toners of yellow (Y), cyan (C), magenta (M), and black (K). By performing the transfer to the intermediate transfer belt 126A for each color, a full color image is formed on the intermediate transfer belt 126A.

The transfer medium for printing the visible image, that is to say the paper sheet, is placed in a paper supply tray such as the paper supply cassettes 132, 133, 134, or the like.

Upon printing, the image forming unit 121 picks up a sheet of the transfer medium from one of the paper feeding trays using a pickup roller 135, and feeds the transfer medium thus picked up into between the intermediate transfer belt 126A and a transfer roller 126B by means of a conveyance roller 136 and a resist roller 137.

The image forming unit 121 transfers the visible image on the intermediate transfer belt 126A onto the transfer medium that has been fed into between the intermediate transfer belt 126A and the transfer roller 126B, and conveys the transfer medium by a conveyance belt 127 to a fusing unit 128 (fusing device) for fusing the visible image. The fusing unit 128 is provided with a heating roller 129 with a built-in heater, and a pressurizing roller 130 that is pressed against the heating roller 129 at a predetermined pressure. When the transfer medium passes between the heating roller 129 and the pressurizing roller 130, the visible image is fused onto the transfer medium by heat and a pressing force applied thereon. The transfer medium onto which the image is fused is ejected to the paper ejection tray 131.

By the above-described steps, the multifunction peripheral 100 provides a copying function to a user.

Figure 3A:
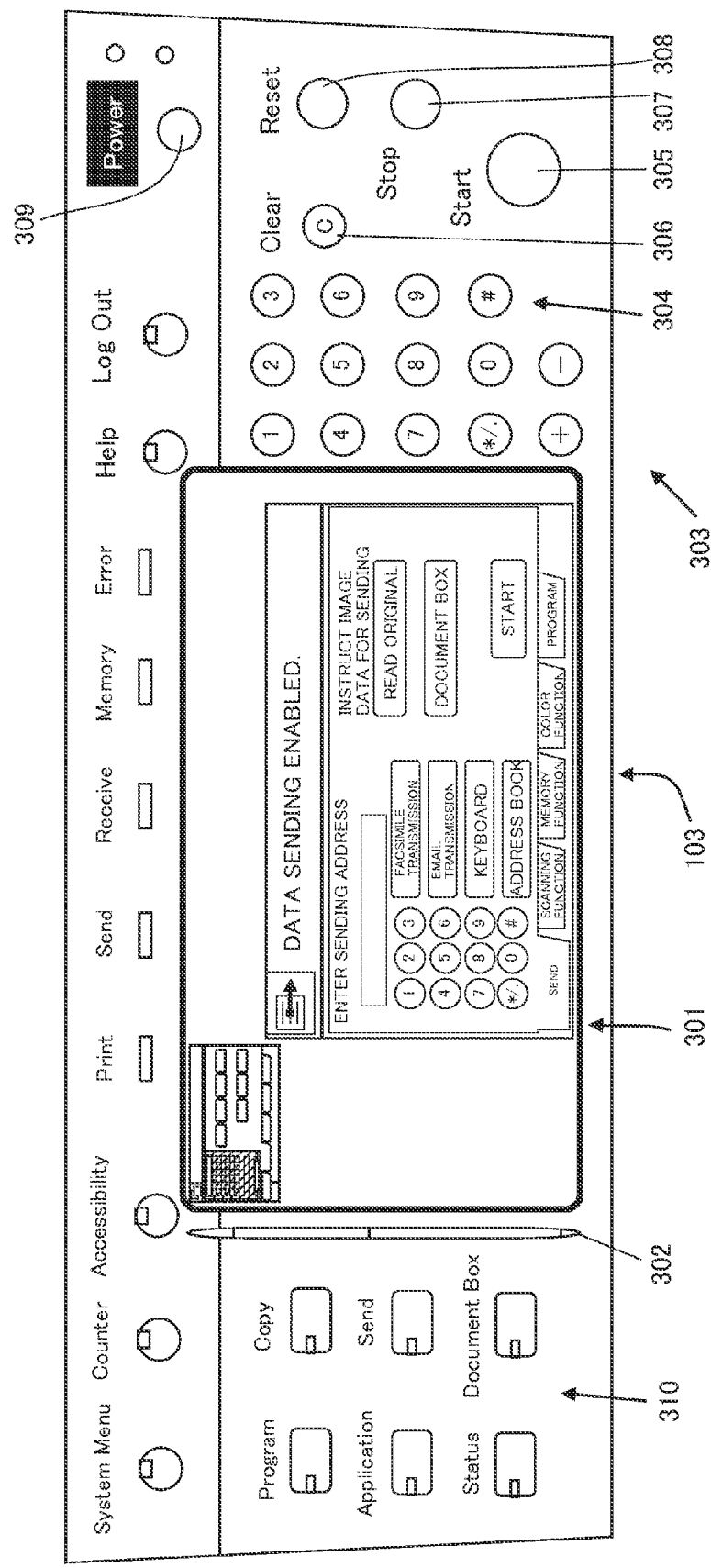
FIG. 3A is a schematic view illustrating the overall configuration of an operation unit according to the present invention.
Figure 3B:
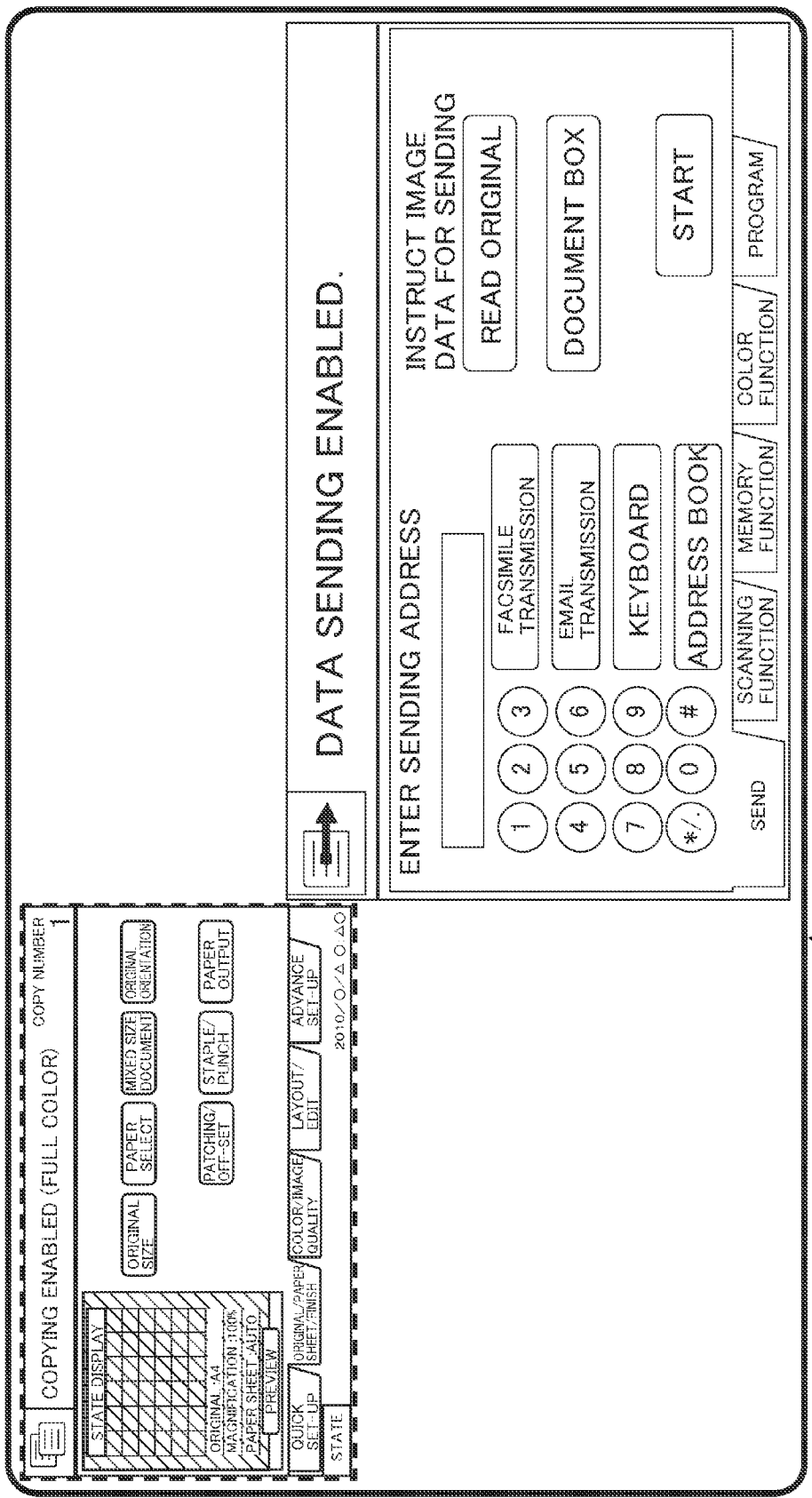
FIG. 3B is an enlarged view of the touch panel of FIG. 3A.

FIG. 3 is a schematic view illustrating the overall configuration of an operation unit according to the present invention. A user inputs setting conditions or the like and confirms the input setting conditions or the like in relation to image formation as described above by use of the operation unit 103. When the setting conditions or the like are input, the touch panel 301 (operation panel) provided in the operation unit 103, the stylus pen 302, and the operation key 303 are used.

The touch panel 301 includes a touch sensor 301a that is disposed on the screen side for detecting contact of a contact object, and a display unit 301b for enabling display of a predetermined screen. The touch panel 301 is configured to enable selection of a predetermined key contained in a predetermined screen.

The touch sensor 301a used in the present embodiment is configured as an analog resistive film. The touch sensor 301a is configured by a translucent upper film and a lower glass base plate being layered via a spacer. On facing surfaces of the upper film and the lower glass base plate, a transparent electrode layer composed of ITO (Indium Tin Oxide) and the like is provided.

The touch sensor 301a screen 301 is composed such that, upon pushing of (contact to) the upper film by a user, the transparent electrode layer on the upper film side and the transparent electrode layer on the lower glass base plate side contact each other at a position corresponding to a pushed position (the contact area, selection area contacted position, contacted area).

The touch sensor 301a applies a voltage to the upper film or the lower glass base plate, and extracts a voltage value corresponding to the pushed position from the lower glass base plate or the upper film to thereby detect a coordinate position (pushed position) corresponding to the voltage value.

When the detected pushed position on the touch panel 301 falls within the display area of a predetermined key or the like such as an icon key or reduced screen key on the screen displayed on the touch panel 301, the predetermined key or the like is selected.

In other words, when the detected pushed position (contact area, selection area) falls within (is superimposed upon) the display area of a predetermined key or the like such as an icon key or reduced screen key as described below that are transparent through the touch panel and are visibly displayed in an outer portion, the touch panel 301 selects the predetermined key or the like. The setting conditions or the like for each function can for example be input in a similar manner by use of keyboard keys, character keys or the like, in addition to the predetermined keys (for example, item keys).

Furthermore, a display unit 301b such as an LCD (liquid crystal display) or the like is provided below the lower glass base plate. The display unit 301b displays a specified screen on the touch panel 301 by displaying a screen such as an initial screen, copy function screen, facsimile sending screen or the like. In this manner, the function of display of setting conditions or the like can be combined with the function of input of the setting conditions or the like on the touch panel 301.

Furthermore, a stylus pen 302 is provided near the touch screen 301. When a user brings the tip of the stylus pen 302 into contact with the touch panel 301 (touch sensor 301a), the touch panel 301 detects the coordinate value corresponding to the contact position (pushed position). When a predetermined key such as the item key, icon key, or reduced function screen key or the like corresponding (overlapping, contained in) the detected coordinate value, the predetermined key is selected. In other words, the user can select and pushes the displayed predetermined key or the like with a stylus pen 302.

Furthermore, a predetermined number of operation keys 303 is provided in proximity to the touch panel 301. The operation keys 303 include for example numeric keys 304, a startup key 305, a clear key 306, a stop key 307, a reset key 308, a power source key 309, and a function key 310. The numeric keys 304 are used for inputting specific numerals when setting a copy number or magnification. Furthermore, the function key 310 is divided into a "copy" key for displaying the copy function screen on the touch panel 301, and a "send" key for displaying the send function screen on the touch panel 301, and the like.

Figure 4:
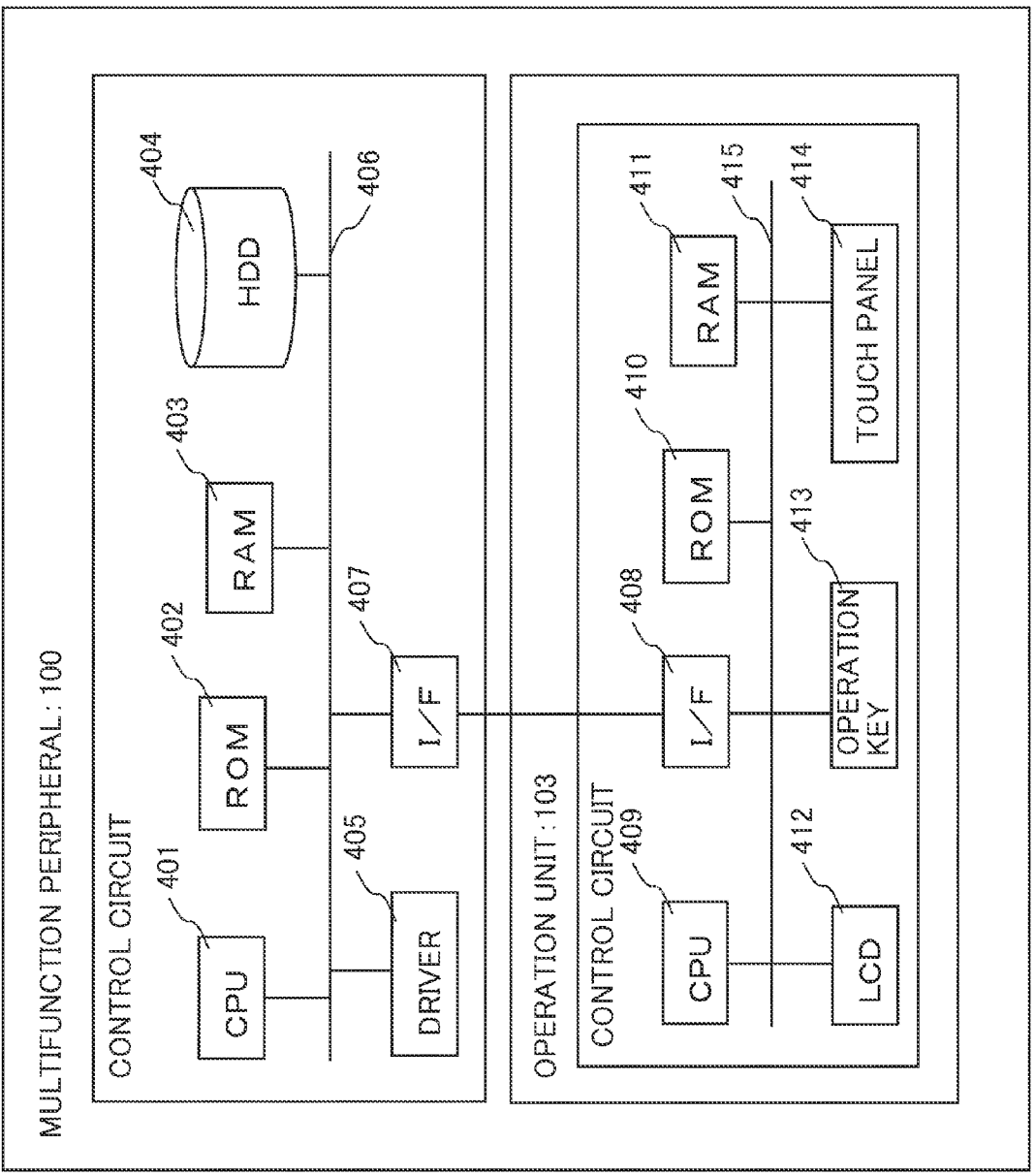
FIG. 4 illustrates the configuration of control-related hardware for an operation unit and a multifunction peripheral according to the present invention.

Next, the configuration of the control hardware for the multifunction peripheral 100 and the operation unit 103 will be described with reference to FIG. 4. FIG. 4 illustrates the configuration of control-related hardware for the multifunction peripheral 100 and the operation unit 103 according to the present embodiment. However, detailed description of each unit not directly related to the present embodiment will be omitted.

The control circuit of the multifunction peripheral 100 is configured from a CPU (central processing unit) 401, a ROM (read only memory) 402, a RAM (random access memory) 403, a HDD (hard disk drive) 404, and a driver 405 corresponding to each drive unit connected by an internal bus 406. The CPU 401 for example uses the RAM 403 as a work area, and controls the operation of each drive unit illustrated in FIG. 1 by execution of programs that are stored in the ROM 402, the HDD 404, or the like, and by exchange of data or instructions from the operation unit 103 or the driver 405 based on the results of executing the programs. Each unit (illustrated in FIG. 5) described hereafter other than the drive units above is operated by execution of programs by the CPU 401.

An internal interface 407 is connected to the internal bus 406 of the control circuit, and the internal interface 407 connects the control circuit of the multifunction peripheral 100 with the control circuit of the operation unit 103 or the like. The CPU 401 receives a command signal through the internal interface 407 from the control circuit of the operation unit 103 or the like, and sends the command signal, data or the like to the control circuit of the operation unit 103 or the like.

Furthermore, the control circuit of the operation unit 103 is configured from a CPU 409, a ROM 410, a RAM 411, a LCD 412, an operation key 413 (303), a touch panel 414 (301), and an internal interface 408 connected by an internal bus 415. When a user operates the operation key 413 or the touch panel 414, the CPU 409 sends a command signal based on the operation through the internal interface 408 to the control circuit of the multifunction peripheral 100. The function of the CPU 409, the ROM 410, and the RAM 411 is the same as the above, and each unit described below (illustrated in FIG. 5) is realized by execution of programs by the CPU 409. The programs or data for realization of each unit described below are stored in the ROM 410.

Figure 5:
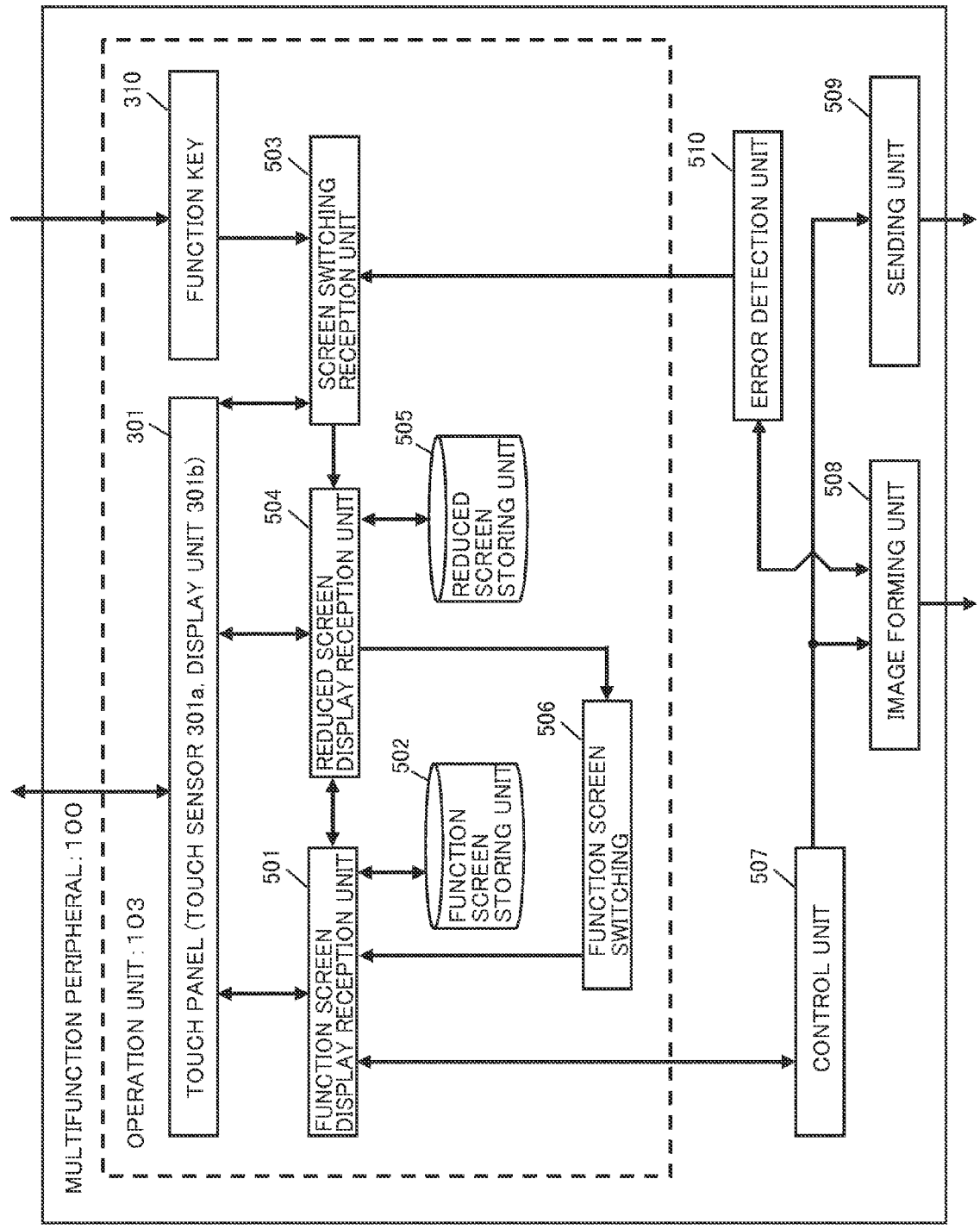
FIG. 5 is a block diagram illustrating the function of the operation unit and the multifunction peripheral according to an embodiment of the present invention.
Figure 6:
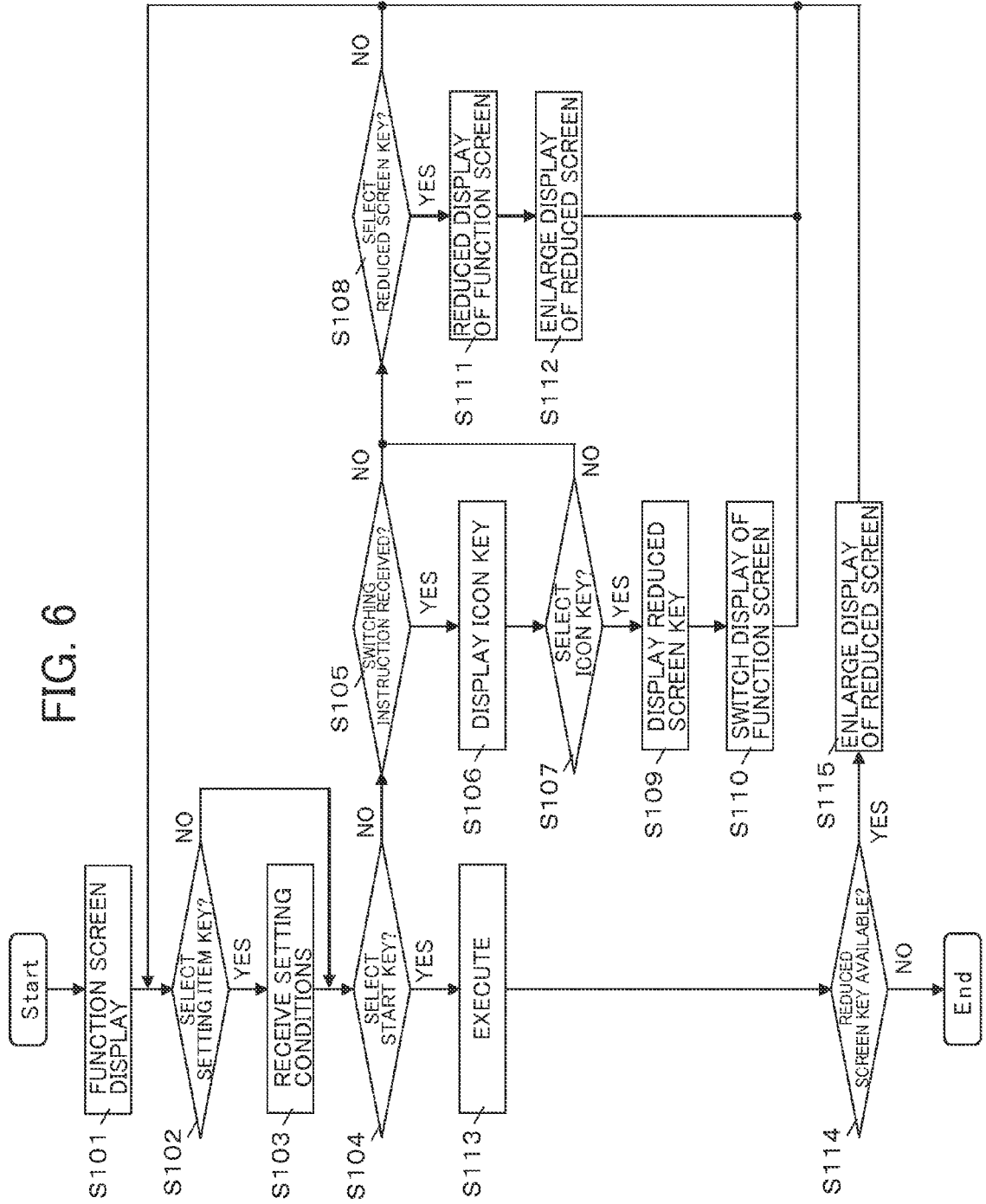
FIG. 6 is a flowchart illustrating the execution order according to an embodiment of the present invention.

Next, the execution sequence according to the present embodiment will be described with reference to FIG. 5 and FIG. 6. FIG. 5 is a block diagram illustrating the function of the operation unit and the multifunction peripheral according to the present embodiment. FIG. 6 is a flowchart illustrating the execution order according to the present embodiment.

Firstly, when the power source of the multifunction peripheral 100 is placed in the ON position, the multifunction peripheral 100 is started up and the operation unit 103 is started up. Then the function screen display reception unit 501 of the operation unit 103 acquires data from the function screen storing unit 502 including data for the function screen (embodying as the first function screen) related to the copy function that is preset as an initial function, position data specifying the screen area displayed by function screen (for example, a coordinate value or the like corresponding to "central portion"), and data related to initial conditions that are preset in relation to the copy function. The function screen display reception unit 501 displays the first function screen on the touch panel 301 (display unit 301b) based on the position data (FIG. 6: S101).

Figure 7A:
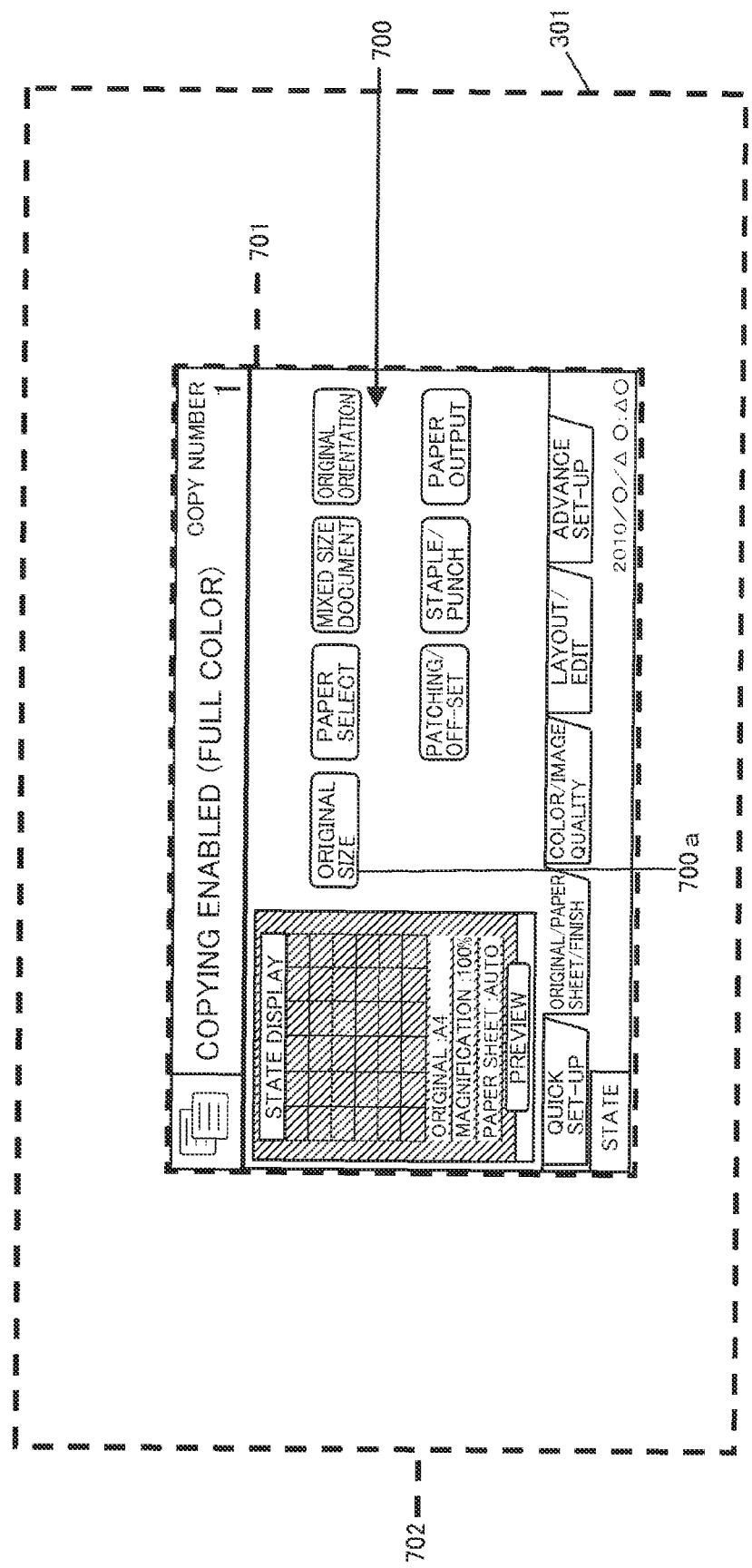
FIG. 7A illustrates an example of a first overall screen displayed on the touch panel according to an embodiment of the present invention.

FIG. 7A illustrates an example of a first overall screen displayed on the touch panel according to the present embodiment.

As illustrated in FIG. 7A, a screen area 701 displaying the first function screen 700 is provided in a central portion of the touch screen 301, and a retreat area 702 (area that is different from the screen area) that includes no display is provided in the periphery of the screen area 701. The first function screen 700 is displayed in a state in which initializing conditions have been received. The role of the retreat area 702 will be described below.

When the user selects (pushes) a setting item key (for example, the "original size" key 700a) related to the copy function in the first function screen 700 (YES in S102 in FIG. 6), the function screen display reception unit 501 receives the selection of the setting item key 700a, and receives the setting conditions corresponding to the setting item (S103 in FIG. 6).

When the user does not select a setting item key (NO in S102 in FIG. 6), the function screen display reception unit 501 enters into the state of receiving the initializing conditions.

Furthermore, when the user does not select the start key 305 of the operation unit 103 while viewing the first function screen 700 (NO in S104 in FIG. 6), and selects the "send" key of the function keys 310 in order to display the function screen (embodying a second function screen) in relation to a sending function (send function), the screen switching reception unit 503 receives a switching instruction to switch from the display of the first function screen 700 to the display of the second function screen in response to the selection of the "send" key (YES in S105 in FIG. 6). Next, the screen switching reception unit 503 displays the icon key (tab key) corresponding to the sending function of the second function screen in a selectable configuration at a predetermined position (for example, lower left corner) in the retreat area 702 (S106 in FIG. 6). The icon key may for example be an icon key modeling an icon key modeling a send function image or an image of the function screen for the send function.

FIG. 7B illustrates an example of an icon key displayed on the touch panel according to the present embodiment.

As illustrated in FIG. 7B, the icon key 703 is displayed in a selectable configuration on the lower left corner 704 of the retreat area 702 on the touch panel 301. In this manner, even when the screen switching reception unit 503 receives a switching instruction, immediate switching of the function screen of the screen area 701 is not executed. Consequently, a user can execute switching of the screen display at a desired timing for switching the screen display. For example, a user encounters confusion and there is an impediment to smooth key operation when the display on the function screen is switched from the first function screen to a function screen related to a predetermined function (for example, a facsimile receiving function, an error detection function, a notification function, or the like) without display of the icon key 703 even though the user has executed a key operation using the first function screen 700. Therefore, when the multifunction peripheral 100 adopts the above configuration, the user can execute smooth key operation and can control the timing of screen display switching.

When the user does not select an icon key 703 and a reduced screen key described below (S107 NO→S108 NO, FIG. 6), and selects a setting item key related to the copy function through the first function screen 700 that is currently displayed on the screen area 701 (YES in S102 in FIG. 6), the function screen display reception unit 501 receives a setting condition corresponding to the setting item (S103 in FIG. 6).

When the user selects the icon key 703 (YES in S107 in FIG. 6), the touch panel 301 detects the selection of the icon key 703, and outputs the information related to the selection of the icon key 703 to the screen switching reception unit 503. The screen switching reception unit 503 receives the selection notification of the icon key 703 from the touch panel 301, and notifies the reduced screen display reception unit 504 to that effect. The reduced screen display reception unit 504 receives the notification, and acquires data related to the first function screen 700 from the function screen display reception unit 501, and refers to a reduced screen table that is pre-stored in the reduced screen storing unit 505.

Figure 8A:
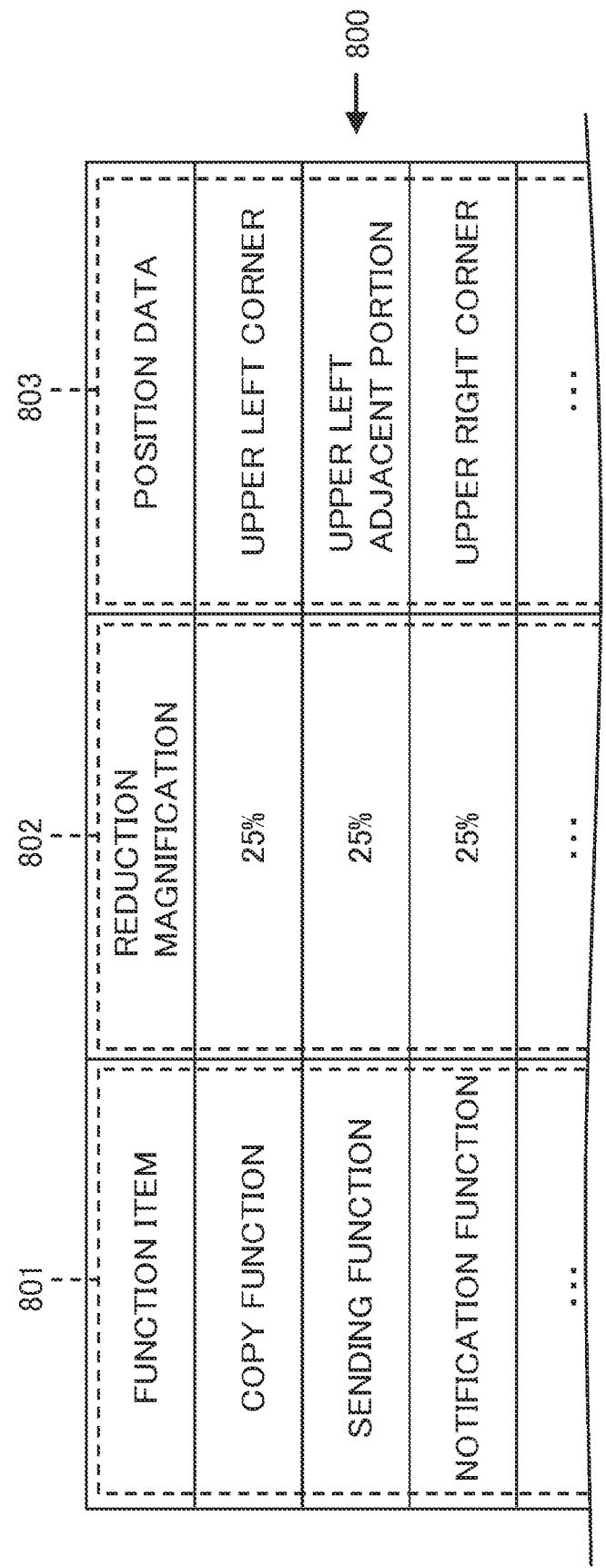
FIG. 8A illustrates an example of a reduced screen table according to an embodiment of the present invention.

FIG. 8A illustrates an example of a reduced screen table according to the present embodiment.

As illustrated in FIG. 8A, the reduced screen table 800 associates and stores a function item 801 corresponding to the function screen, a reduction magnification 802 enabling the display of the function screen on the retreat area 702 (for example, a user such as an administrator or the like sets a preset reduction magnification of "25%" or the like to enable display of the function screen on the retreat area 702), and position data 803 (for example, a coordinate value corresponding to "upper left corner") in the retreat area 702 for specifying the display position of the reduced screen that is reduced using the reduction magnification 802.

The reduction magnification for example is set to a magnification enabling display of the function screen after reduction within a range of 4 to 6 screens arranged in a horizontal configuration above the retreat area 702. In this manner, the visibility of the reduced screen can be ensured.

As described above, a user executing repetitive use of the operation unit 103 can associate and store (learn) the specified position of the retreat area 702 and the function of the reduced screen by pre-setting the display position of the reduced screen (position data 803) in response to the type of function of the reduced screen (function item 801). For this reason, the user can simply comprehend the function of the reduced screen (function item) by simple visual confirmation of the reduced screen displayed at a specified position on the retreat area 702. The multifunction peripheral 100 can improve the operational characteristics and visibility characteristics for a user.

Furthermore, the reduced screen display reception unit 504 looks up the reduced screen table 800, collates the function item 801 of the reduced screen table 800 with the function item (copy function) of the first function screen 700, and acquires a reduction magnification 802 ("25%") corresponding to the collated function item 801 and position data 803 ("upper left corner"). Next, the reduced screen display reception unit 504 reduces the first function screen 700 based on the reduction magnification 802, and displays the first reduced screen key after reduction on the touch screen 301 in a selectable configuration at a predetermined position on the retreat area 702 based on the position data 803 (S109 in FIG. 6).

Figure 8B:
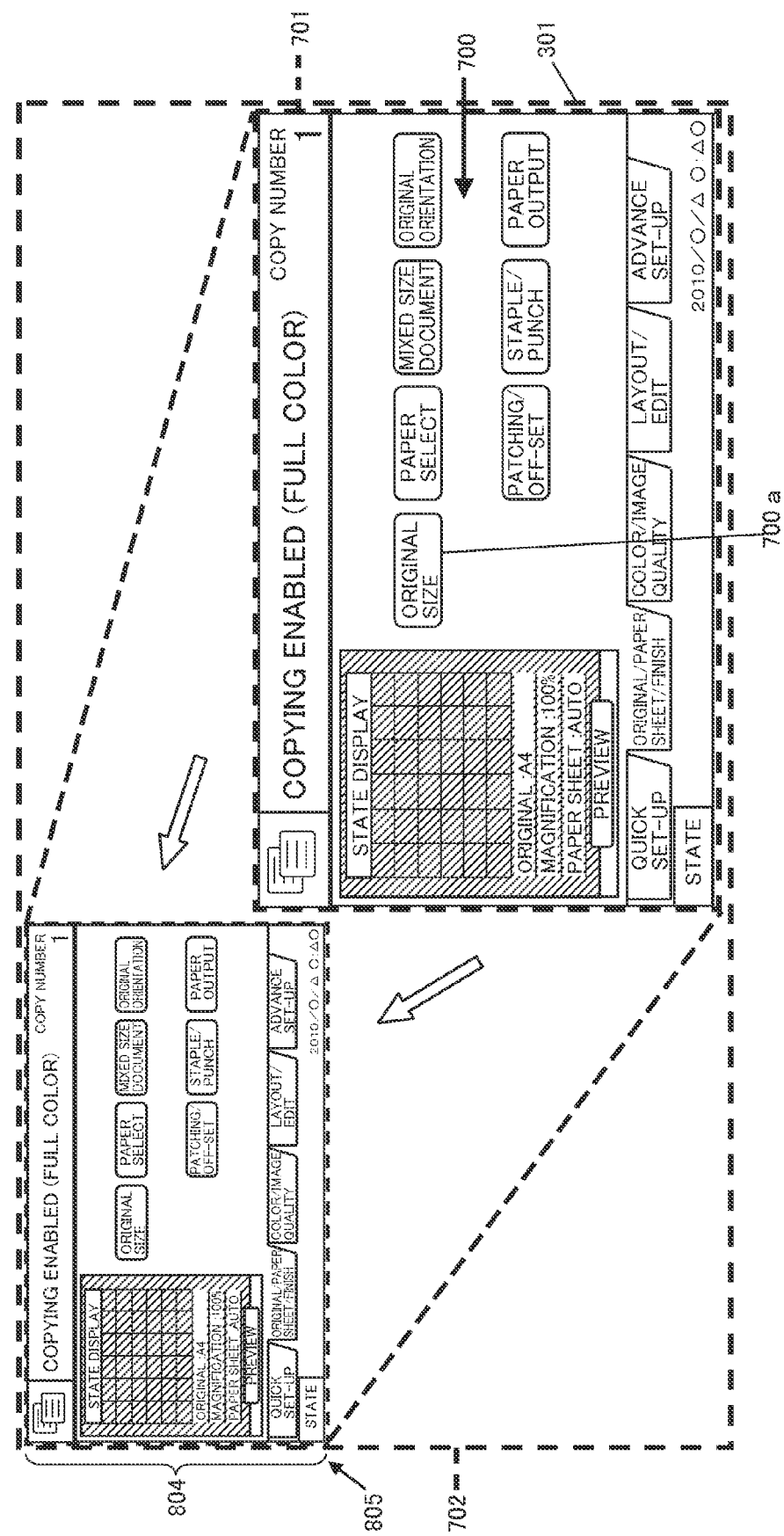
FIG. 8B illustrates an example of a first reduced screen displayed on the touch panel according to an embodiment of the present invention.

FIG. 8B illustrates an example of a first reduced screen displayed on the touch panel according to the present embodiment.

As illustrated in FIG. 8B, the reduced screen display reception unit 504 displaces (retreats) the first function screen 700 that is being reduced and displayed in the screen area to the upper left corner 804 of the retreat area 702 in accordance with the position data 803, and displays a screen that displays the reduced first function screen 700 as a first reduced screen key 805 on the touch panel 301. The multifunction peripheral 100 uses this type of animation display to enable direct visual notification to a user of the correspondence between a reduced screen and the first function screen.

Next, the reduced screen display reception unit 504 displays the first reduced screen key 805, and notifies the function screen switching unit 506 to that effect. The function screen switching unit 506 receives the notification, and instructs the function screen display reception unit 501 to switch the first function screen 700 that is displayed on the screen area 701 to the second function screen. The function screen display reception unit 501 receives the instruction and acquires data for the second function screen and data related to initialization conditions for the sending function from the function screen storing unit 502, and then displays the second function screen in the screen area 701 on the touch panel 301 (S110 in FIG. 6).

FIG. 9A illustrates an example of a second overall screen displayed on the touch panel according to the present embodiment.

As illustrated in FIG. 9A, the first reduced screen key 805 is displayed in the upper left corner 804 of the retreat area 702 on the touch panel 301, and the second function screen 900 is displayed in the screen area 701. In this manner, even when the function image display is switched, the image shown on the function screen before switching does not impede the display of the function screen after switching, and display as a reduced image key is possible. For this reason, the user can directly and visually comprehend the contents of the image showing the function screen before switching.

For example, when an image showing a function screen before switching is changed into an icon or a character string adapted to the function screen, and displayed, since the icon or character string is a new image (information), notwithstanding the fact that the shown image displays the function screen switched by the user themselves, the user may not be able to simply comprehend that the content of the image shows the function screen before switching. When the image displaying the function screen before switching is displayed by the reduced screen key, since the user has already seen the image (screen), the user has a sufficient recollection of the reduced screen. Therefore, the user can simply comprehend that the content of the image shows the function screen before switching.

For example, when a user selects a setting item key related to a send function though the second function image 900 after switching (S110→S102 YES in FIG. 6), the function screen display reception unit 501 receives the setting conditions that related to the setting item (S103 in FIG. 6).

Furthermore, when the user does not select the start key 305 while viewing the second function screen 900 after switching (NO in S104 in FIG. 6), and then decides to display the first function screen 700 before switching again and therefore selects the first reduced screen key 805 (YES in S108 in FIG. 6), the reduced screen display reception unit 504 receives the selection of the first reduced screen key 805, acquires data in relation to the second function screen 900 from the function screen display reception unit 501, and looks up the reduced screen table 800 stored in the reduced screen storing unit 505. Next, the reduced screen display reception unit 504 acquires a reduction magnification 802 ("25%") corresponding to the function item (send function) of the second function screen 900 and position data 803 ("upper left adjacent portion") from the reduced screen table 800. The reduced screen display reception unit 504 reduces the second function screen 900 based on the reduction magnification 802, and displays the second reduced screen key in a reduced configuration on the touch screen 301 in a selectable configuration at a predetermined position in the retreat area 702 based on the position data 803 (S111 in FIG. 6).

FIG. 9B illustrates an example of a second reduced screen displayed on the touch panel according to the present embodiment.

The reduced screen display reception unit 504 displaces (retreats) the second function screen 900 displayed in the screen area to the upper left adjacent portion 901 of the retreat area 702 in accordance with the position data 803, and displays a screen that displays the reduced second function screen 900 as a second reduced screen key 902 on the touch panel 301. Therefore, in the same manner as the above description, the multifunction peripheral 100 makes a direct and visual notification to the user of the correspondence of a reduced screen and the second function screen 900. In this manner, a user can easily comprehend the details (function) of the function screen corresponding to the reduced screen, and without error, can select a reduced screen key corresponding to the desired function screen.

When the second reduced screen key 902 is displayed on the touch panel 301, the reduced screen display reception unit 504 notifies the function screen switching unit 506 to that effect. The function screen switching unit 506 receives the notification, and instructs the function screen display reception unit 501 to switch the second function screen 701 that is displayed on the screen area 701 to the first function screen 700 that corresponds to the first reduced screen key 805 that is selected by the user. The function screen display reception unit 501 receives the instruction and displays the first function screen 700 on the screen area 701 on the touch panel 301 (S112 in FIG. 6).

FIG. 10A illustrates an example of a third overall screen displayed on the touch panel according to the present embodiment.

The function screen display reception unit 501 enlarges the first reduced screen 805 displayed in the retreat area 702, displaces it to the screen area 701, and displays the screen that displays the enlarged first reduced screen 805 as a first function screen 700 on the touch panel 301. In this manner, the multifunction peripheral 100 makes a direct and visual notification to a user of switching to the first function screen 700.

When the second reduced screen key 902 is displayed in the upper left adjacent portion 901 of the retreat area 702, the user completes input of the setting conditions through the first function screen 700 displayed on the screen area 701 (S103 in FIG. 6), and when the start key 305 is selected (YES in S104 in FIG. 6), the function screen display reception unit 501 receives the selection of the start key 305, and notifies the control unit 507 to that effect. The control unit 507 receives the notification, and notifies the image forming unit 508 that can execute a copying function of the first function screen 700, of the setting conditions received before selection of the start key 305 (or preset initializing conditions), and then causes execution of the copying function (S113 in FIG. 6). In this manner, the image forming unit 508 executes image formation based on the setting conditions. When setting conditions have been input through the second function screen 900, and the start key 305 has been selected, a sending unit 509 that can execute the sending function of the second function screen 900 executes the sending function.

Then the function screen display reception unit 501 notifies the control unit 507, and then notifies the function screen switching unit 506 that the predetermined function is executed. The function screen switching unit 506 receives the notification, and determines whether or not the reduced screen is displayed at a predetermined position on the retreat area 702 of the touch panel 301 (S114 in FIG. 6).

As a result of this determination, when the reduced screen key (for example, the second reduced screen 902) is displayed in the predetermined position (upper left adjacent portion) of the retreat area 702 (YES in S114 in FIG. 6), there exists a function screen with a function that has not yet been executed. The function screen switching unit 506 instructs the function screen display reception unit 501 to switch the function screen on which a function has already been completely executed (first function screen 700) to the second function screen 900 corresponding to the second reduced screen on which a function that has not yet been executed. The function screen display reception unit 501 receives the instruction and displays the second function screen 900 on the screen area 701 of the touch panel 301 (S115 in FIG. 6).

Figure 10B:
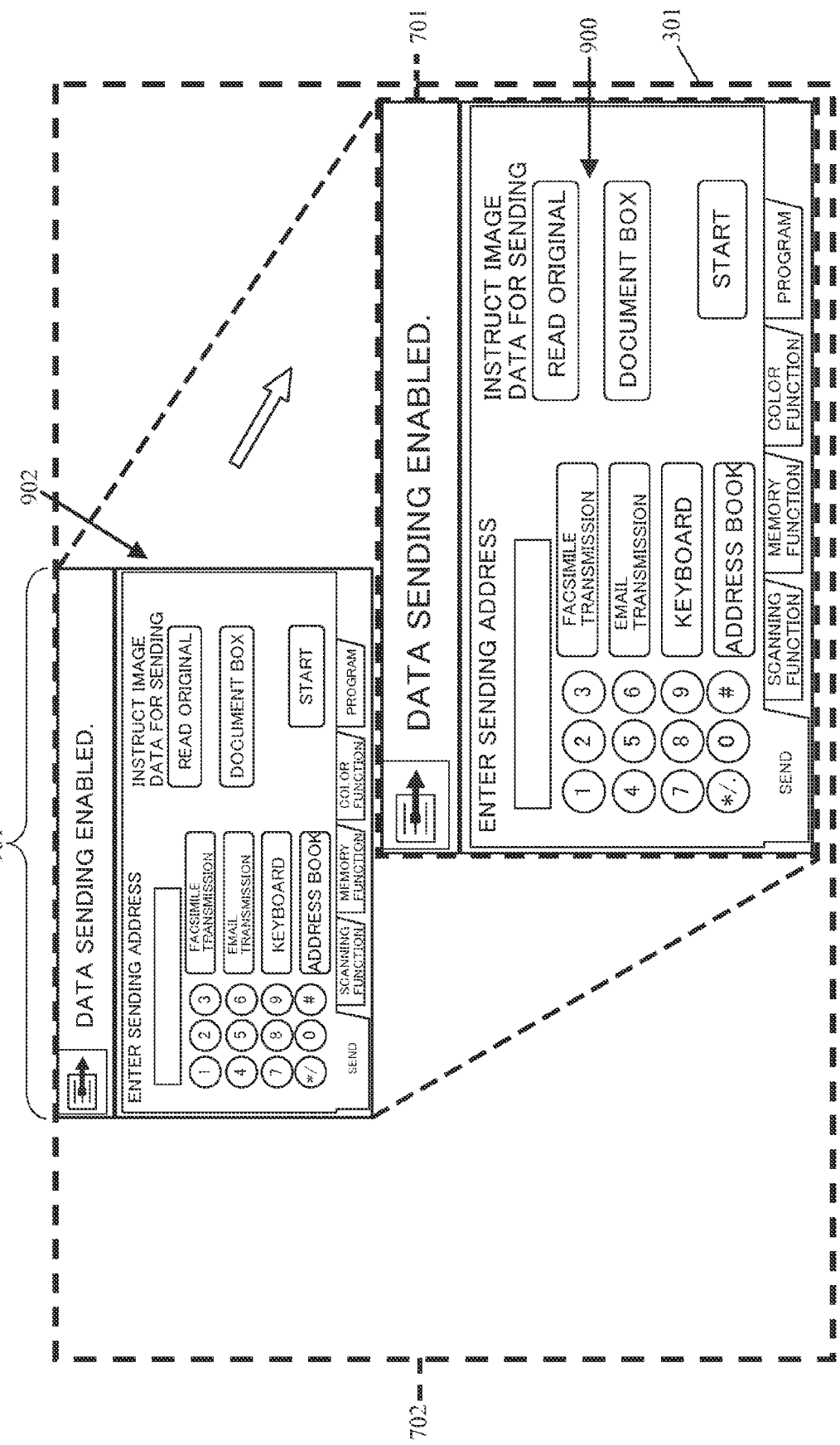
FIG. 10B illustrates an example of a fourth overall screen displayed on the touch panel according to an embodiment of the present invention.

FIG. 10B illustrates an example of a fourth overall screen displayed on the touch panel according to the present embodiment.

The function screen display reception unit 501 enlarges the second reduced screen 902 displayed in the retreat area 702, displaces it to the screen area 701, and displays the screen displaying the enlarged second reduced screen 902 as a second function screen 900 on the touch panel 301. In this manner, the multifunction peripheral 100 enables prompting of the input of setting conditions on a function screen by notifying the user of the existence of a function screen on which a function that has not yet been executed.

When the plurality of reduced screen keys is displayed on the retreat area 702, the function screen switching unit 506 selects a reduced screen key with a high predetermined sequence (for example, a clockwise sequence with reference to a reduced screen key that is displayed in an upper portion of the retreat area 702), and instructs the function screen display reception unit 501 to switch to the function screen corresponding to the selected reduced screen key. In this manner, even when a plurality of reduced screen keys is displayed, the multifunction peripheral 100 can switch the function screen in a predetermined sequence, and prompt a user to execute sequential input of setting conditions.

This determination shows that execution of functions on the function screen is completed when the reduced screen key is not displayed on the predetermined position of the retreat area 702 (NO in S114 in FIG. 6). In this case, the function screen switching unit 506 completes switching of the function screen.

The operation unit 103 according to the present embodiment includes a touch panel 301 that has a touch sensor 301a that is disposed on the top surface side for detecting contact of a contact object, and a display unit 301b for enabling display of a predetermined screen, the touch panel configured to enable selection of a predetermined key contained in a predetermined screen, a function screen display reception unit 501 for displaying a screen including a screen area 701 for display of a first function screen 700 related to one function and a second function screen 900 related to a second function, and a retreat area 702 being an area that is different from the screen area 701, an operation key 303 (operation unit) for receiving an operation from an external unit, a screen switching reception unit 503 for display of an icon key 703 corresponding to the second function screen 900 on the touch panel 301 at a predetermined selectable position on the retreat area 702 upon receipt of an instruction to switch from the display of the first function screen 700 to display of the second function screen 900 through the operation key 303 (operation unit), when displaying the first function screen 700 in the screen area 701, a reduced screen display reception unit 504 that displays a first reduced screen key 805 for reducing the first function screen 700 on the touch panel 301 in a selectable configuration in the retreat area 702 when the icon key 703 on the touch panel 301 is selected, and a function screen switching unit 506 for switching the display of the first function screen 700 in the screen area 701 to the display of the second function screen 900 when the first reduced screen key 805 is displayed in the retreat area 702.

In this manner, the multifunction peripheral 100 displays the icon key corresponding to the function screen for the object to be switched in an selectable configuration without immediately switching the function screen display in response to the switching instruction. As a result, the key operation on the function screen before switching does not cause an impediment, and a user can accurately execute a key operation and can control the switching timing of the function screen display. Furthermore, even when switching of the function screen display is performed on the multifunction peripheral 100, the image showing the function screen before switching is displayed as a reduced screen of the function screen that has been visually confirmed by the user in a retreat area that does not impede display of the function screen after switching. As a result, a user can suitably comprehend that the image displays the function screen before switching, and can visually and directly comprehend the function screen details after switching of the function screen display. As a result, the multifunction peripheral 100 can improve the visibility and operation characteristics for a user before and after switching the function image display.

The present embodiment configures a screen area 701 in a central portion of the touch panel 301, and a retreat area 702 in a peripheral portion of the screen area 701. However, there is no particular limitation on the configuration of retreat area 702, and for example, the retreat area may be configured in any of the upper portion, lower portion, left side portion, or right side portion of the screen area 701.

Furthermore, in the present embodiment, although the icon key is displayed in a selectable configuration in the lower left corner portion of the retreat area 702, there is no particular limitation on the display position of the icon key, and for example, the icon key may be configured in any of the upper portion, lower portion, left side portion, or right side portion of the retreat area 702.

Furthermore, in the present embodiment, although the position of display of the first reduced screen key 805 and the position of display of the second reduced screen key 902 are positioned in an adjacent configuration, another configuration may be employed. For example, the first reduced screen key 805 and the second reduced screen key 902 may be configured to display with a predetermined interval provided therebetween.

Furthermore, when a user selects the "Send" key of the function keys 310, although the screen switching reception unit 503 receives an instruction to switch from the display of the first function screen 700 to the display of the second function screen corresponding to the selection of the "Send" key, there is no particular limitation in this regard. The screen switching reception unit 503 may be configured to receive a switching instruction in response to selection of another hardware key or another software key. Furthermore, the screen switching reception unit 503 may be configured to receive a signal outputted from a predetermined functional unit (trigger output unit) as a switching instruction (trigger).

As an example, an error display function that displays an error screen will be described below.

For example, firstly, the user executes image formation on the image forming unit 508 though the first function screen 700 that is related to the copying function, and then inputs the setting conditions while observing the second function screen 900 that is related to the sending function. In this state, when an error detection unit 510 for detection of an error related to image formation (a paper jam (JAM) or the like) detects an error in the image forming unit 508, the error detection unit 510 (trigger output unit) sends an instruction (trigger) to switch from the display of the second function screen 900 to the display of an error screen (an error screen related to the error).

The image switching reception unit 503 receives the switching instruction (YES in S105 in FIG. 6), and displays an icon key of the error screen corresponding to the error display function in a selectable configuration at a predetermined position on the retreat area 702 (S106 in FIG. 6).

Figure 11A:
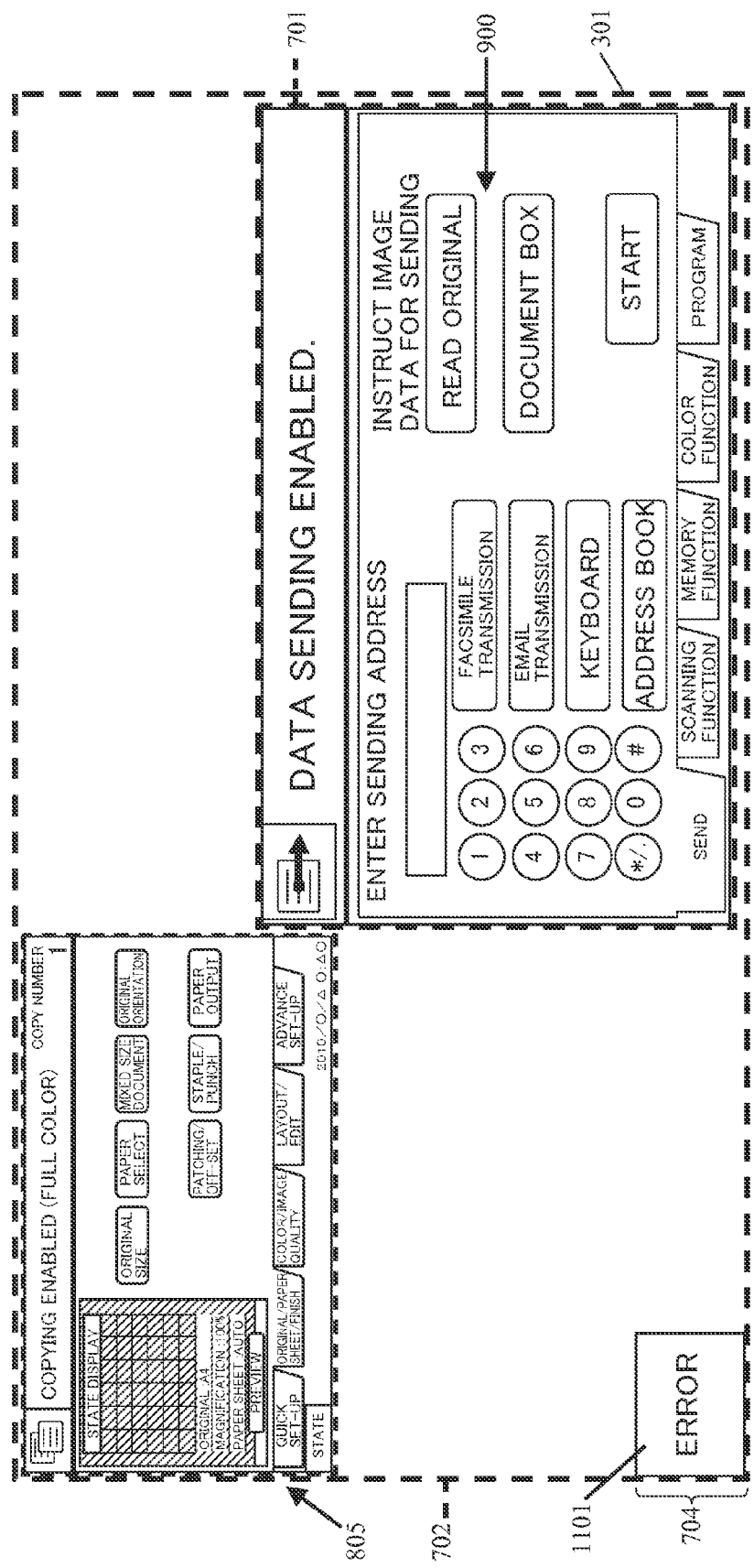
FIG. 11A illustrates an example of an error screen displayed on the touch panel according to an embodiment of the present invention.

FIG. 11A illustrates an example of an error screen displayed on the touch panel according to the present embodiment.

As illustrated in FIG. 11A, on the touch panel 301, a first reduced screen key 805 is displayed at a predetermined position of the retreat area 702 and a second function screen 900 is displayed on the screen area 701. For example, an icon key 1101 that corresponds to the error display function is displayed in a selectable configuration in the lower left corner portion 704 of the retreat area 702. In this manner, since the second function screen 900 does not immediately switch to the error screen, there is no impediment to input of key operations by the user, and therefore the user does not become confused.

When the user selects the icon key 1101 (YES in S107 in FIG. 6), the image switching reception unit 503 receives the selection of the icon key 1101. The reduced screen display reception unit 504 reduces the second function screen 900 based on a predetermined reduction magnification, and displays the second reduced screen key after reduction in a selectable configuration in a predetermined position of the retreat area 702 of the touch panel 301 based on the predetermined position data (S109 in FIG. 6).

Furthermore, the function screen switching unit 506 instructs the function screen display reception unit 501 to switch from the second function screen 900 that is displayed in the screen area 701 to the error screen. The function screen display reception unit 501 acquires data for an error screen from the function screen storing unit 502, and displays the error screen in the screen area 701 (S110 in FIG. 6).

FIG. 11B illustrates an example of an error screen displayed on the touch panel according to the present embodiment.

As illustrated in FIG. 11B, on the touch panel 301, a first reduced screen key 805 and a second reduced screen key 902 are respectively displayed at a predetermined position of the retreat area 702, and an error screen 1100 is displayed in the screen area 701. In this manner, the multifunction peripheral 100 can display an error screen that is produced during operation even during parallel operation or execution by a user of a plurality of functions, and can place a function screen that was operating into a retreat configuration as a reduced screen. Furthermore, since the function screen that is operating is displayed as a reduced screen key, the user can directly and visually comprehend the details of the image that shows the function screen before switching, and can execute error cancellation with confidence while observing the error screen.

Furthermore, although the operation unit 103 according to the present embodiment is used in relation to the processing for the copying function of the multifunction peripheral 100, for example, use is possible in relation to a facsimile send/receive function, a printer function, a notification function, an error detection function, and an interrupt function, or the like. Furthermore, in the present embodiment, although the operation unit 103 has been described in relation to application to the multifunction peripheral 100, application with the same operation and effect is also possible in relation to various types of image forming apparatuses, various types of measurement apparatuses, or various types of electronic apparatuses that are provided with an operation unit 103 (operation device) that has a touch panel 301.

Furthermore, in the present embodiment although the operation unit 103 was configured with various units, a configuration may include provision of a storage medium that enables storage of a program for realizing the respective units in the storage medium. This configuration enables reading out of the program by the multifunction peripheral 100 or by the operation unit 103 to thereby realize the respective units by the multifunction peripheral 100 or by the operation unit 103. In this case, the program itself that is read out of the storage medium may embody the operation and effect of the present invention. Furthermore, provision is also possible of the steps for realizing each unit as a method stored in a hard disk.

What is claimed is:

1. An operation device comprising:
   a touch panel that has a touch sensor disposed on a top surface side for detecting contact of a contact object, and a display unit for displaying a screen, the touch panel configured to enable selection of a key contained in the screen;
   a function screen display reception unit configured to cause the touch panel to display the screen including a screen area for displaying a first function screen related to a first function and a second function screen related to a second function, and a retreat area being different from the screen area;
   an operation unit for receiving an operation from an external unit;
   a screen switching reception unit configured to cause the touch panel to display an icon key symbolizing the second function of the second function screen in a selectable configuration at a predetermined position of the retreat area so as to notify in advance a user of switching display for the screen area being on standby when the first function screen is displayed in the screen area and an instruction is received from the user through the operation unit to switch from the first function screen to the second function screen;
   a reduced screen display reception unit configured to cause the touch panel to display a first reduced screen key representative of a reduced image of the first function screen in a selectable configuration in the retreat area when the icon key is manipulated by the user on the touch panel; and
   a function screen switching unit for switching from the first function screen to the second function screen in the screen area when the first reduced screen key is displayed in the retreat area.

2. The operation device according to claim 1, wherein the reduced screen display reception unit causes the touch panel to display a second reduced screen key representative of a reduce image the second function screen in a selectable configuration in the retreat area when the first reduced screen key displayed in the retreat area of the touch panel is manipulated by the user, and
   the function screen switching unit switches from the second function screen to the first function screen in the screen area when the second reduced screen key is displayed in the retreat area.

3. The operation device according to claim 2, wherein the reduced screen display reception unit causes the touch panel to display the first reduced screen key and the second reduced screen key in a selectable configuration at a preset position in the retreat area, respectively.

4. The operation device according to claim 1, wherein the function screen display reception unit causes the touch panel to form
   the screen area in a central portion of the screen, and
   the retreat area in a peripheral area of the screen.

5. The operation device according to claim 2, wherein, when the first reduced screen key or the second reduced screen key is displayed in a selectable configuration in the retreat area, the reduced screen display reception unit displaces the first function screen or the second function screen displayed in the screen area to the retreat area while reducing the first function screen or the second function screen, and causes the touch panel to display a screen displaying the first reduced screen key or the second reduced screen key, and
   when the first reduced screen key or the second reduced screen key is selected on the touch panel, the function screen switching unit causes the function screen display reception unit to displace the first reduced screen key or the second reduced screen key while enlarging the first reduced screen key or the second reduced screen key displayed in the retreat area to the screen area, and causes the touch panel to display a screen displaying the first function screen or the second function screen.

6. An image forming apparatus comprising an operation device, the operation device including
   a touch panel that has a touch sensor that is disposed on a top surface side for detecting contact of a contact object, and a display unit for displaying a screen, the touch panel configured to enable selection of a key contained in the screen;
   a function screen display reception unit configured to cause the touch panel to display the screen including a screen area for displaying a first function screen related to first function and a second function screen related to a second function, and a retreat area being different from the screen area;

an operation unit for receiving an operation from an external unit;

a screen switching reception unit configured to cause the touch panel to display an icon key symbolizing the second function of the second function screen in a selectable configuration at a predetermined position in the retreat area so as to notify in advance a user of switching display for the screen area being on standby when the first function screen is displayed in the screen area and an instruction is received from the user through the operation unit to switch from the first function screen to the second function screen;

a reduced screen display reception unit configured to cause the touch panel to display a first reduced screen key representative of an reduced image of the first function screen in a selectable configuration in the retreat area when the icon key is manipulated by the user on the touch panel; and a function screen switching unit for switching from the first function screen to second function screen in the screen area when the first reduced screen key is displayed in the retreat area.

7. The image forming apparatus according to claim 6, wherein the reduced screen display reception unit causes the touch panel to display a second reduced screen key representative of a reduced image of the second function screen in a selectable configuration in the retreat area when the first reduced screen key displayed in the retreat area of the touch panel is manipulated by the user, and the function screen switching unit switches from the second function screen to the first function screen in the screen area when the second reduced screen key is displayed in the retreat area.

8. The image forming apparatus according to claim 7, wherein the reduced screen display reception unit causes the touch panel to display the first reduced screen key and the second reduced screen key in a selectable configuration at a preset position in the retreat area, respectively.

9. The image forming apparatus according to claim 6, wherein the function screen display reception unit causes the touch panel to form the screen area in a central portion of the screen, and
the retreat area in a peripheral area of the screen.

10. The image forming apparatus according to claim 7, wherein, when the first reduced screen key or the second reduced screen key is displayed in a selectable configuration in the retreat area, the reduced screen display reception unit displaces the first function screen or the second function screen displayed in the screen area to the retreat area while reducing the first function screen or the second function screen, and causes the touch panel to display a screen displaying the first reduced screen key or the second reduced screen key, and when the first reduced screen key or the second reduced screen key is selected on the touch panel, the function screen switching unit causes the function screen display reception unit to displace the first reduced screen key or the second reduced screen key while enlarging the first reduced screen key or the second reduced screen key displayed in the retreat area to the screen area, and causes the touch panel to display a screen displaying the first function screen or the second function screen.

11. An operation method for an operation device including a touch panel that has a touch sensor that is disposed on a top surface side for detecting contact of a contact object, a display unit for enabling display of a screen, the touch panel configured to enable selection of a key contained in the screen, and an operation unit for receiving an operation from an external unit, the method including;

causing the touch panel to display a screen including a screen area for displaying a first function screen related to a first function and a second function screen related to a second function, and a retreat area that is different from the screen area;

causing the touch panel to display an icon key symbolizing the second function of the second function screen in a selectable configuration at a predetermined position of the retreat area so as to notify in advance a user of switching the screen area being on standby when the first function screen is displayed in the screen area and an instruction is received from the user through the operation unit to switch from the first function screen to the second function screen;

causing the touch panel to display a first reduced screen key representative of a reduced image of the first function screen in a selectable configuration in the retreat area when the icon key is manipulated by the user on the touch panel; and switching from the first function screen to the second function screen in the screen area when the first reduced screen key is displayed in the retreat area.

12. An operation device comprising;

a touch panel that has a touch sensor that is disposed on a top surface side for detecting contact of a contact object, and a display unit for displaying a screen, the touch panel configured to enable selection of a key contained in the screen;

a function screen display reception unit for configured to cause the touch panel to display the screen including a screen area for displaying a first function screen related to a first function and a second function screen related to a second function, and a retreat area being different from the screen area;

a trigger output unit for outputting a trigger;

a screen switching reception unit configured to cause the touch panel to display an icon key symbolizing the second function of the second function screen in a selectable configuration at a predetermined position of the retreat area so as to notify in advance a user of switching display for the screen area being on standby when the first function screen is displayed in the screen area and a trigger is received from the trigger output unit, a reduced screen display reception unit configured to cause the touch panel to display a first reduced screen key representative of a reduced image of the first function screen in a selectable configuration in the retreat area when the icon key is manipulated by the user on the touch panel; and a function screen switching unit for switching from the first function screen to the second function screen in the screen area when the first reduced screen key is displayed in the retreat area.

* * * * *